United States Patent
Yu et al.

(10) Patent No.: US 12,369,672 B2
(45) Date of Patent: Jul. 29, 2025

(54) SYSTEMS AND METHODS FOR VENTED HELMETS

(71) Applicant: Specialized Bicycle Components, Inc., Morgan Hill, CA (US)

(72) Inventors: Ming Xi Yu, Guangzhou (CN); Allen Albert Bischofberger, Ben Lomond, CA (US); Christopher Thomas Pietrzak, Redwood City, CA (US); Michael Joseph Krynock, Morgan Hill, CA (US)

(73) Assignee: Specialized Bicycle Components, Inc., Morgan Hill, CA (US)

( * ) Notice: Subject to any disclaimer, the term of this patent is extended or adjusted under 35 U.S.C. 154(b) by 0 days.

(21) Appl. No.: 18/280,406

(22) PCT Filed: Mar. 4, 2022

(86) PCT No.: PCT/US2022/018956
§ 371 (c)(1),
(2) Date: Sep. 5, 2023

(87) PCT Pub. No.: WO2022/187656
PCT Pub. Date: Sep. 9, 2022

(65) Prior Publication Data
US 2024/0148098 A1 May 9, 2024

Related U.S. Application Data

(60) Provisional application No. 63/157,506, filed on Mar. 5, 2021.

(51) Int. Cl.
*A42B 3/28* (2006.01)
*A42B 3/06* (2006.01)

(52) U.S. Cl.
CPC ............... *A42B 3/28* (2013.01); *A42B 3/066* (2013.01)

(58) Field of Classification Search
CPC .. A42B 3/28; A42B 3/283; A42B 3/06; A42B 3/062; A42B 3/066
See application file for complete search history.

(56) References Cited

U.S. PATENT DOCUMENTS 287,137 A * 10/1883 Lee ........................... A42B 3/20
2/9
1,522,024 A   1/1925 Nixon, Jr.
(Continued)

FOREIGN PATENT DOCUMENTS

CN       304153561     6/2017
EP       0581460 A1    2/1994
(Continued)

OTHER PUBLICATIONS

Amazon, Smith Optics Persist MIPS Road Cycling Helmet, https://www.amazon.com/dp/B08R5XYLQG/?th=1, first available Dec. 30, 2020, 7 pages.
(Continued)

*Primary Examiner* — Heather Mangine
(74) *Attorney, Agent, or Firm* — Quarles & Brady LLP

(57) ABSTRACT

A helmet is provided that can include a cage defining a front end, a back end opposite the front end, a first lateral end and a second lateral end opposite the first lateral end. The cage can include multiple longitudinal beams that extend between the back end of the cage and the front end of the cage; and a transverse beam that extends between the first lateral end of the cage and the second lateral end of the cage. The transverse beam can be anchored to the multiple longitudinal beams. The helmet can include a body that fully encapsulates the multiple longitudinal beams of the cage and that partially encapsulates the transverse beam. The body can
(Continued)

define multiple vents. Each vent can be situated between two adjacent longitudinal beams. The transverse beam can extend through one of the multiple vents.

15 Claims, 23 Drawing Sheets

(56) References Cited

U.S. PATENT DOCUMENTS

| | | | | |
|---|---|---|---|---|
| 1,868,926 A * | 7/1932 | Tatore | ............... | A42B 3/06 2/421 |
| 2,763,005 A * | 9/1956 | Richter | ............... | A42B 3/12 2/10 |
| 4,594,737 A * | 6/1986 | Butash | ............... | A42B 3/20 2/9 |
| 4,633,531 A * | 1/1987 | Nimmons | ............... | A42B 3/20 2/9 |
| 4,653,123 A | 3/1987 | Broersma | | |
| 4,736,466 A * | 4/1988 | Kallstrom | ............... | A63B 71/10 2/427 |
| 4,901,373 A | 2/1990 | Broersma | | |
| 4,903,350 A | 2/1990 | Gentes et al. | | |
| 5,023,958 A | 6/1991 | Rotzin | | |
| 5,088,130 A * | 2/1992 | Chiarella | ............... | A42B 3/066 2/421 |
| 5,099,523 A | 3/1992 | Broersma | | |
| 5,119,516 A * | 6/1992 | Broersma | ............... | A42B 3/28 2/412 |
| 5,123,121 A | 6/1992 | Broersma | | |
| 5,177,815 A | 1/1993 | Andujar | | |
| 5,249,347 A * | 10/1993 | Martinitz | ............... | B21K 17/00 2/9 |
| 5,267,353 A * | 12/1993 | Milligan | ............... | A42B 3/20 2/9 |
| 5,269,025 A | 12/1993 | Broersma | | |
| 5,272,773 A | 12/1993 | Kamata | | |
| 5,309,576 A | 5/1994 | Broersma | | |
| 5,351,341 A | 10/1994 | Broersma | | |
| 5,351,342 A | 10/1994 | Garneau | | |
| 5,381,560 A | 1/1995 | Halstead | | |
| D361,407 S | 8/1995 | Ho | | |
| D361,409 S | 8/1995 | Ho | | |
| D361,410 S | 8/1995 | Ho | | |
| D361,411 S | 8/1995 | Ho | | |
| D363,570 S | 10/1995 | Ho | | |
| 5,477,563 A * | 12/1995 | Gentes | ............... | B29C 70/70 2/425 |
| D366,538 S | 1/1996 | Ho | | |
| 5,481,762 A * | 1/1996 | Gentes | ............... | B29C 70/70 2/412 |
| 5,519,895 A | 5/1996 | Barnes, Jr. | | |
| D372,559 S | 8/1996 | Murakami | | |
| 5,551,094 A | 9/1996 | Navone | | |
| 5,581,819 A | 12/1996 | Garneau | | |
| 5,598,588 A | 2/1997 | Lee | | |
| 5,619,756 A * | 4/1997 | Garneau | ............... | A42B 3/066 2/425 |
| 5,745,923 A * | 5/1998 | Katz | ............... | A42B 3/00 2/425 |
| 5,794,271 A | 8/1998 | Hastings | | |
| 5,794,272 A | 8/1998 | Workman et al. | | |
| 5,867,840 A | 2/1999 | Hirosawa et al. | | |
| 5,887,288 A | 3/1999 | Arney et al. | | |
| D411,338 S | 6/1999 | Egger et al. | | |
| 5,915,537 A | 6/1999 | Dallas et al. | | |
| D413,185 S | 8/1999 | Egger | | |
| 5,950,244 A | 9/1999 | Fournier et al. | | |
| 6,012,178 A | 1/2000 | Schuster et al. | | |
| 6,029,269 A | 2/2000 | El-Soudani | | |
| 6,055,675 A * | 5/2000 | Egger | ............... | A42B 3/28 2/425 |
| 6,070,271 A | 6/2000 | Williams | | |
| D427,727 S | 7/2000 | Ho | | |
| D437,092 S | 1/2001 | Ho | | |
| D445,544 S | 7/2001 | Ho | | |
| 6,292,952 B1 | 9/2001 | Watters et al. | | |
| 6,292,954 B1 * | 9/2001 | O'Bradaigh | ............... | A42B 3/20 2/9 |
| 6,343,385 B1 * | 2/2002 | Katz | ............... | A42B 3/00 2/412 |
| 6,385,781 B1 * | 5/2002 | Rose | ............... | A63B 71/1291 2/468 |
| 6,401,261 B1 | 6/2002 | Arney et al. | | |
| 6,425,141 B1 | 7/2002 | Ewing et al. | | |
| 6,425,142 B2 | 7/2002 | Sasaki et al. | | |
| 6,532,602 B2 | 3/2003 | Watters et al. | | |
| 6,550,071 B2 | 4/2003 | Garneau | | |
| 6,604,246 B1 | 8/2003 | Obreja | | |
| D482,501 S | 11/2003 | Ho | | |
| 6,647,556 B2 * | 11/2003 | Grepper | ............... | A42B 3/324 2/418 |
| D495,835 S | 9/2004 | Ho | | |
| D495,836 S | 9/2004 | Fang | | |
| D516,751 S | 3/2006 | Ho | | |
| 7,069,601 B1 * | 7/2006 | Jacobsen | ............... | A42B 3/08 2/421 |
| D536,832 S | 2/2007 | Ho | | |
| D540,490 S | 4/2007 | Grepper et al. | | |
| D563,052 S | 2/2008 | Fang | | |
| 7,698,750 B2 | 4/2010 | Bullock | | |
| 7,739,783 B1 | 6/2010 | Jacobsen | | |
| D770,687 S * | 11/2016 | Chen | ............... | D29/102 |
| D773,120 S | 11/2016 | Storey et al. | | |
| 9,585,432 B2 | 3/2017 | Garneau et al. | | |
| 9,883,709 B2 | 2/2018 | Penner et al. | | |
| D815,777 S | 4/2018 | Grim et al. | | |
| 10,051,909 B2 * | 8/2018 | Zhang | ............... | A42B 3/0426 |
| D846,199 S | 4/2019 | Chae | | |
| D860,544 S | 9/2019 | Rong et al. | | |
| D903,946 S | 12/2020 | Pietruck | | |
| D915,679 S | 4/2021 | Ocklenburg | | |
| D920,582 S | 5/2021 | Chen | | |
| D938,657 S | 12/2021 | Kele et al. | | |
| 11,304,470 B2 | 4/2022 | Kele et al. | | |
| D970,820 S | 11/2022 | Gong | | |
| D972,225 S | 12/2022 | Marting | | |
| D979,146 S | 2/2023 | Krauter | | |
| D994,986 S | 8/2023 | Kele et al. | | |
| D995,919 S | 8/2023 | Lian | | |
| D1,010,231 S * | 1/2024 | Pietrzak | ............... | D29/102 |
| D1,050,611 S * | 11/2024 | de Melo Dias | ............... | D29/102 |
| 2001/0022005 A1 | 9/2001 | Sasaki et al. | | |
| 2002/0023291 A1 | 2/2002 | Mendoza | | |
| 2002/0124298 A1 | 9/2002 | Muskovitz | | |
| 2003/0056279 A1 * | 3/2003 | Garneau | ............... | A42B 3/281 2/425 |
| 2003/0139104 A1 | 7/2003 | Arai | | |
| 2003/0221245 A1 | 12/2003 | Lee et al. | | |
| 2004/0025229 A1 | 2/2004 | Takahashi et al. | | |
| 2006/0248630 A1 | 11/2006 | Bullock et al. | | |
| 2007/0000022 A1 * | 1/2007 | Jacobsen | ............... | A42B 3/08 2/171 |
| 2007/0220662 A1 | 9/2007 | Pierce | | |
| 2007/0277295 A1 * | 12/2007 | Bullock | ............... | A42B 3/066 2/411 |
| 2007/0277296 A1 * | 12/2007 | Bullock | ............... | A42B 3/062 2/411 |
| 2008/0141429 A1 | 6/2008 | Scharpenack et al. | | |
| 2013/0305435 A1 * | 11/2013 | Surabhi | ............... | A42B 3/067 2/414 |
| 2014/0317819 A1 * | 10/2014 | Jurga | ............... | A42B 3/20 2/9 |
| 2015/0096113 A1 * | 4/2015 | Garneau | ............... | A42B 3/062 2/414 |
| 2016/0021967 A1 * | 1/2016 | Finiel | ............... | A42B 3/066 264/250 |
| 2016/0175684 A1 * | 6/2016 | Sumelius | ............... | A63B 71/10 2/410 |
| 2016/0183619 A1 * | 6/2016 | Del Ramo | ............... | A42B 3/062 2/411 |
| 2018/0125143 A1 * | 5/2018 | Herbert | ............... | A42B 3/128 |

(56) References Cited

U.S. PATENT DOCUMENTS

| | | | |
|---|---|---|---|
| 2019/0090574 A1* | 3/2019 | Shaffer | A42B 3/08 |
| 2019/0183203 A1* | 6/2019 | Krynock | A42B 3/28 |
| 2019/0357622 A1* | 11/2019 | Fontana | A42B 3/06 |
| 2020/0029644 A1* | 1/2020 | Kele | A42B 3/066 |
| 2022/0015487 A1* | 1/2022 | McDermott | A42B 3/06 |
| 2023/0371640 A1* | 11/2023 | Bischofberger | A42B 3/04 |
| 2024/0148098 A1* | 5/2024 | Yu | B29C 70/86 |
| 2024/0334996 A1* | 10/2024 | Riederer | A42B 3/063 |

FOREIGN PATENT DOCUMENTS

| | | |
|---|---|---|
| GB | 6228823 | 9/2022 |
| WO | 9501739 A1 | 1/1995 |
| WO | 2022187656 A1 | 9/2022 |

OTHER PUBLICATIONS

Amazon, MET—ESTRO MIPS Bike Helmet, https://www.amazon.com/dp/B09HSPDV2N/?th=1, first available Oct. 5, 2021, 8 pages.
Amazon, Giro Aries Spherical Bike Helmet, https://www.amazon.com/dp/B0CKRXBVST/?th=1, first available Oct. 21, 2022, 7 pages.
Youtube, Introducing S-Works Prevail 3, https://www.youtube.com/watch?v=SrZh7Erh6lg&t=1s, first available Jun. 30, 2022, 3 pages.
Mitchell, Review: Specialized S-Works Prevail II Vent Helmet, Jun. 24, 2021, https://www.feedthehabit.com/gear-reviews/review-specialized-s-works-prevail-ii-vent/, 5 pages.
S-Works Prevail II Vent MIPS, 2022, https://www.eriksbikeshop.com/s-works-prevail-ii-vent-mips-2022-pr5a10699/p#, 3 pages.
Specialized Bicycle Components, Inc., Specialized Road 2011, Catalog, 3 pages.
PCT International Search Report and Written Opinion, PCT/US2022/018956, Jun. 8, 2022, 14 pages.

\* cited by examiner

SYSTEMS AND METHODS FOR VENTED HELMETS

CROSS-REFERENCE TO RELATED APPLICATIONS

This application is a US National Stage of International Application No. PCT/US2022/018956 filed Mar. 4, 2022, which claims priority under 35 U.S.C. § 119 to U.S. Provisional Patent Application No. 63/157,506 filed on Mar. 5, 2021, the entire contents of which are incorporated herein by reference.

STATEMENT REGARDING FEDERALLY SPONSORED RESEARCH

N/A.

BACKGROUND

Helmets are generally worn to provide a buffer between a user's head and an object that comes into contact with the helmet. While helmets are used during various activities, such as during construction, mining, etc., a large proportion of manufactured helmets are used for sporting activities. For example, bicycle helmets are worn by cyclists, which when worn appropriately under certain circumstances can help to provide a buffer in the event of a fall or crash. While some bicycle helmets can provide a suitable buffer, helmets can often be uncomfortable. Thus, it would be desirable to have systems and methods for helmet constructions that allow for improved comfort while maintaining a desired buffer.

SUMMARY OF THE DISCLOSURE

Some embodiments of the disclosure provide a helmet. The helmet can include a cage defining a front end, a back end opposite the front end, a first lateral end and a second lateral end opposite the first lateral end. The cage can include multiple longitudinal beams that extend between the back end of the cage and the front end of the cage, and a transverse beam that extends between the first lateral end of the cage and the second lateral end of the cage. The transverse beam can be anchored to one or more of the multiple longitudinal beams. The helmet can include a body that fully encapsulates the multiple longitudinal beams of the cage and that partially encapsulates the transverse beam. The body can define one or more vents. Each vent can be situated between different pairs of adjacent longitudinal beams of the multiple longitudinal beams. The transverse beam can extend through at least one of the one or more vents.

In some embodiments, the one or more vents comprise multiple vents. The transverse beam can be configured to extend through at least two of the multiple vents.

In some embodiments, the transverse beam is anchored to two or more of the multiple longitudinal beams. The transverse beam can be configured to be tensilely loaded when a first end of the transverse beam is anchored to a first one of the two or more of the multiple longitudinal beams and a second end of the transverse beam is anchored to a second one of the two or more of the multiple longitudinal beams.

In some embodiments, the transverse beam is configured to extend over two or more of the multiple longitudinal beams.

In some embodiments, a width of the transverse beam is less than or equal to approximately 2.5 millimeters.

In some embodiments, the transverse beam is coupled to at least one of the longitudinal beams with an adhesive.

In some embodiments, the transverse beam is wrapped around at least one of the longitudinal beams. Furthermore, in some embodiments, the transverse beam is wrapped around a first one of the longitudinal beams in a first direction and wrapped around ad adjacent second one of the longitudinal beams in a second, opposite direction.

In some embodiments, at least part of the transverse beam is a braided filament.

In some embodiments, the transverse beam comprises a flexible synthetic fiber.

In some embodiments, at least one of the one or more of the multiple longitudinal beams is an unbraided filament.

In some embodiments, the entire cage is encapsulated in a resin layer.

In some embodiments, the body only partially encapsulates the transverse beam.

In some embodiments, the body comprises expanded foam polymer.

In some embodiments, at least part of the transverse beam includes a non-circular cross-section.

In some embodiments, at least part of the transverse beam includes a thermoplastic polyurethane coating.

In some embodiments, the transverse beam wraps around the one or more of the multiple longitudinal beams multiple times along a length of the one or more of the multiple longitudinal beams.

In some embodiments, the transverse beam is tied to the one or more of the multiple longitudinal beams by at least one tie wrapping.

In some embodiments, the cage further includes a second transverse beam that extends away from the first lateral end of the cage and toward the second lateral end of the cage. The second transverse beam can be anchored to one or more of the multiple longitudinal beams.

In some embodiments, the first transverse beam and the second transverse beam are anchored to different ones of the multiple longitudinal beams.

In some embodiments, the first transverse beam and the second transverse beam are anchored to the same one of the multiple longitudinal beams at different locations.

In some embodiments, the first transverse beam and the second transverse beam are sandwiched between a first set of plates at the first lateral end and sandwiched between a second set of plates at the second lateral end.

Some embodiments of the disclosure provide a helmet. The helmet can include a cage defining a front end, a back end opposite the front end, a first lateral end and a second lateral end opposite the first lateral end. The cage can include a longitudinal beam that extends between the back end of the cage and the front end of the cage, a transverse beam that extends between the first lateral end of the cage and the second lateral end of the cage, the transverse beam being coupled to the longitudinal beam, and a fin coupled to the longitudinal beam, the transverse beam extending through the fin. The helmet can include a body that fully encapsulates the longitudinal beam including the fin and that at least partially encapsulates the transverse beam. The body can define one or more vents.

In some embodiments, a portion of the transverse beam that is not encapsulated by the body extends across at least one of the one or more vents.

In some embodiments, the fin is planar.

Some embodiments of the disclosure provide a helmet. The helmet can include a cage defining a front end, a back end opposite the front end, a first lateral side and a second lateral end opposite the first lateral end. The cage can include a rim that extends around a periphery of the cage, multiple longitudinal beams that extend between the back end of the cage and the front end of the cage, and a transverse beam that extends between the first lateral end of the cage and the second lateral end of the cage, the transverse beam being anchored to two or more of the multiple longitudinal beams and the rim. The helmet can include a body that fully encapsulates the multiple longitudinal beams of the cage and that only partially encapsulates the transverse beam. The body can define one or more vents. Each vent can be situated between different pairs of adjacent longitudinal beams of the multiple longitudinal beams. The transverse beam can extend through at least one of the one or more vents. The transverse beam can be a braid filament.

The foregoing and other aspects and advantages of the present disclosure will appear from the following description. In the description, reference is made to the accompanying drawings that form a part hereof, and in which there is shown by way of illustration one or more exemplary versions. These versions do not necessarily represent the full scope of the disclosure.

BRIEF DESCRIPTION OF THE DRAWINGS

The following drawings are provided to help illustrate various features of non-limiting examples of the disclosure, and are not intended to limit the scope of the disclosure or exclude alternative implementations.

DETAILED DESCRIPTION

Figure 1:
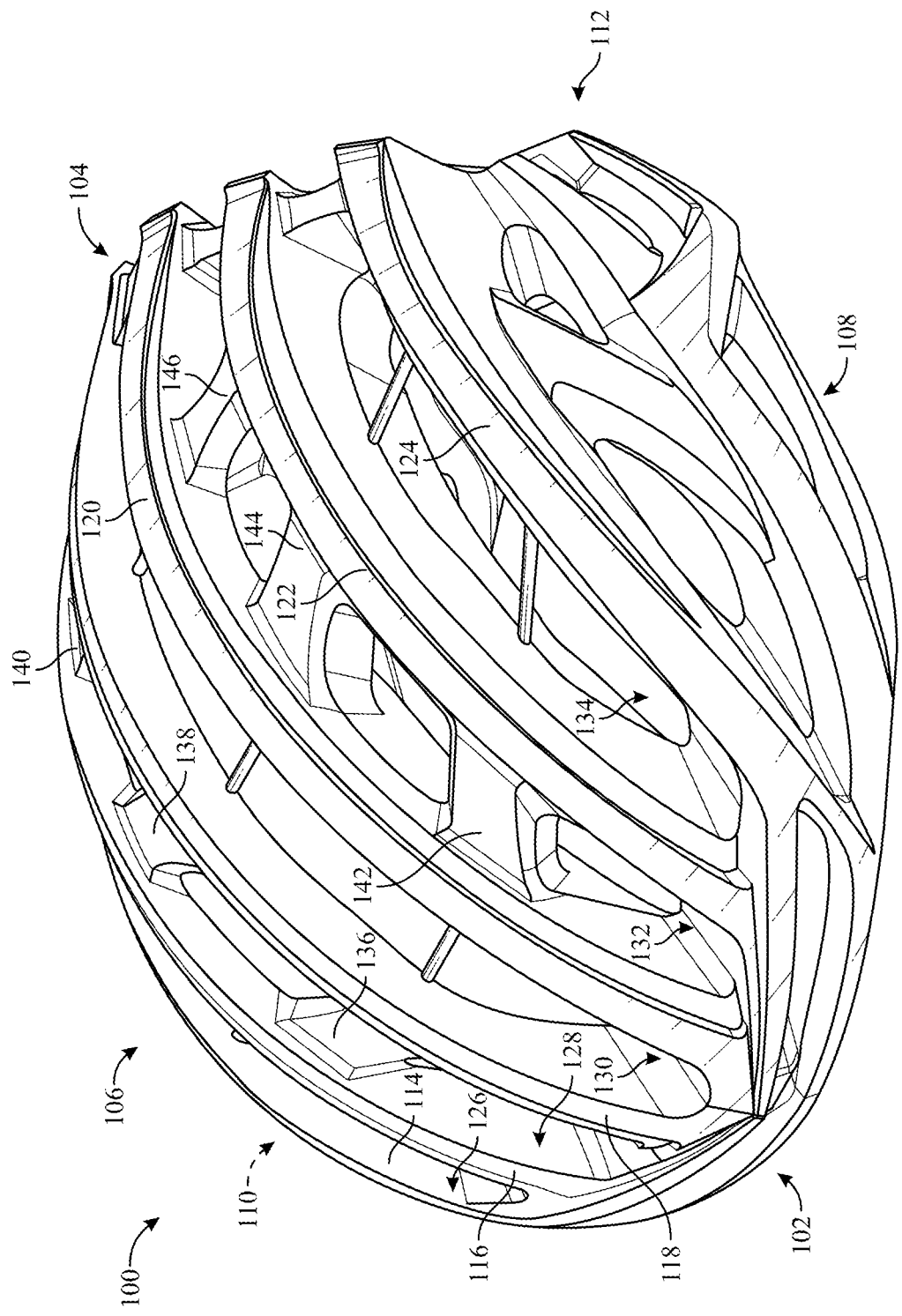
FIG. 1 shows a front isometric view of a helmet.

Bicycle helmets can help provide a buffer during certain activities. These helmets often include a generally hemispherical body with a cavity that receives the head of the user. Straps of a fit system are coupled to the hemispherical body to be secured around the user's chin (e.g., via a clip), and the hemispherical body may provide some level of cushioning for the user's head during a fall. However, there can be user-convenience related downsides to the hemispherical design. For example, these helmets tend to be bulky and heavy, may lack aerodynamic qualities, can be uncomfortable (e.g., causing sweat accumulation and preventing sweat evaporation), and can provide poor thermal characteristics.

Some conventional approaches have attempted to address the issues with the hemispherical configuration. For example, some bicycle helmets have added vents that may decrease the bulkiness and weight of the helmet, and provide an airflow path, allowing air to flow into and out of the vents to facilitate sweat evaporation from the user's head. These airflow paths not only permit pathways for improved sweat evaporation, but also provide a cooling flow of air against the user's head as the user moves. While these vents can be beneficial, they can influence the structural integrity of a helmet. Thus, conventionally, either the thickness of the helmet or the density of the helmet (or both) often must be increased to compensate for the addition of vents.

Various approaches have attempted to address some of these issues by incorporating a reinforcement member into the helmet. For example, the reinforcement member may be formed out of a relatively rigid material and is embedded within the material of the helmet. While this construction can provide additional structural rigidity for the helmet, eliminating the need for increased thickness (or density) of the main material of the helmet (e.g., the structure where the reinforcement member is embedded into), this configuration does not eliminate all issues. Rather, these helmets can still be uncomfortable, have additional bulk and weight, have less than ideal thermal characteristics (e.g., ventilation characteristics), and still influence structural integrity.

Some embodiments of the disclosure provide advantages to the above-described issues and others by providing improved systems and methods for vented helmets. For example, some embodiments of the disclosure provide a bicycle helmet with a cage having multiple beams, including longitudinal beams and transverse beams, and a body. The body fully encapsulates the longitudinal beams of the cage, partially encapsulates the transverse beams of the cage, and includes multiple vents, each situated between two adjacent longitudinal beams. Each transverse beam of the cage is anchored to the longitudinal beams and extends through each of the vents. Furthermore, each transverse beam has portions that extend entirely through the vents, and which are not encapsulated by the body. In this way, the vents can be considerably more open as compared to previous helmets because the thickness of the non-encapsulated transverse beams is significantly thinner than that of an encapsulated portion of the transverse beam. Thus, air can more easily flow through the vents as they are less impeded from flow by the body of the helmet. As a result, the helmet can provide increased ventilation and, thus, better cool the user (e.g., by permitting evaporative cooling of sweat and by allowing cooling airflow through the vents during riding). This configuration also decreases the total weight of the helmet while maintaining the desired buffer of the helmet (e.g., the desired impact attenuation performance of the helmet). For example, because the transverse beams are anchored to the other portions of the cage, the transverse beams can distribute collision forces throughout the cage and the body. Thus, the helmet provides sufficient structural integrity while still eliminating portions of the body to create vents, thereby decreasing the total weight and bulkiness of the helmet.

FIG. 1 shows a front isometric view of a helmet 100 according to some embodiments. The helmet 100 can define a front end 102, a rear end 104, and lateral ends 106, 108. The helmet 100 can include a cage 110, and a body 112 that partially encapsulates the cage 110, each of which can be formed out of different materials. For example, in some embodiments, the cage 110 can be formed from flexible synthetic fibers, such as aramid (e.g., Kevlar®) that are fully encapsulated in a resin layer prior to or after the formation of the cage 110, while the body 112 can be formed out of an expansive foam polymer (e.g., expanded polystyrene ("EPS") foam). In many embodiments, the helmet 100 further can include a shell (not shown). The shell can be coupled to a portion (e.g., an exterior portion) of the body 112, and can be formed from a plastic material (e.g., polycarbonate). In these or other embodiments, the shell can be formed of a material having a greater hardness than a material forming the body 112.

Generally, the body 112 can include multiple longitudinal ribs and one or more vents defined between adjacent longitudinal ribs (e.g., between different pairs of adjacent longitudinal ribs). More specifically, as shown in FIG. 1, the body 112 includes six longitudinal ribs 114, 116, 118, 120, 122, 124 that extend longitudinally from the rear end 104 of the helmet 100 to the front end 102 of the helmet 100. Situated between adjacent longitudinal ribs 114, 116, 118, 120, 122, 124 are five respective vents 126, 128, 130, 132, 134 that can also extend longitudinally from the rear end 104 of the helmet 100 toward the front end 102 of the helmet 100. In particular, the vent 126 is situated between the longitudinal ribs 114, 116, the vent 128 is situated between the longitudinal ribs 116, 118, the vent 130 is situated between the longitudinal ribs 118, 120, the vent 132 is situated between the longitudinal ribs 120, 122, and the vent 134 is situated between the longitudinal ribs 122, 124. It should be noted that, while six longitudinal ribs and five vents are described in detail herein, more or fewer ribs and vents may be incorporated in some embodiments.

Furthermore, the body 112 can at least partially (e.g., only partially) encapsulate the cage 110. As such, in some embodiments, portions of the cage 110 remain exposed outside of the body 112. More specifically, and as described in more detail below, portions of the cage 110 extend through one or more of the vents 126, 128, 130, 132, 134, with some of those portions being encapsulated by the body 112, and with others not being encapsulated by the body 112. For example, in some embodiments, portions of the cage 110 can be situated within or across the vents 126, 130, 134 and are not encapsulated by the body 112, while other portions of the cage 110 are situated within or across the vents 128, 132 and are fully encapsulated by the body 112. In particular, as shown in FIG. 1, the body 112 can include a first set of bridges 136, 138, 140 that extend between the longitudinal ribs 116, 118 (i.e., across the vent 128), each of which encapsulates a portion of the cage 110. Similarly, the body 112 also includes a second set of bridges 142, 144, 146 that extend between the longitudinal ribs 120, 122 (i.e., across the vent 132), each of which also encapsulates a portion of the cage 110. The bridges 136, 138, 140 are separated from each other along the length of the vent 128 and, similarly, the bridges 142, 144, 146 are separated from each other along the length of the vent 132.

As the thickness of a bridge 136-146 is greater than the thickness of the cage 110, the bridges 136-146 can help to increase structural rigidity of the helmet 100. For example, the first set of bridges 136, 138, 140 are positioned within the vent 128, which is positioned between the vents 126, 130 (i.e., that receive portions of the cage 110 that are not-encapsulated with the body 112). In this way, the vent 128 with the bridges 136, 138, 140 can compensate for the adjacent vents 126, 130 that do not have bridges, which independently may have a reduced structure, and lower structural integrity. Similarly, the second set of bridges 142, 144, 146 are positioned within the vent 132, and the vent 132 is positioned between the vents 130, 134 that do not have bridges, thereby structurally compensating for the adjacent vents 130, 134 with less structure. As a result, the overall structural integrity of the helmet 100 is maintained.

Accordingly, in some embodiments, this alternating pattern of a vent without bridges followed by a vent with bridges, from the lateral end 106 to the opposite lateral end 108 of the helmet 100, can maximize ventilation of the helmet 100 while compensating for reductions in the structural integrity of the helmet 100. Additionally, while the illustrated embodiment has an alternating pattern with three vents 126, 130, 134 without bridges, and two vents 128, 132 with bridges, in alternative configurations, the vents 126, 130, 134 can include bridges (e.g., encapsulating, with the body 112, the exposed portions of the cage 110), while the vents 128, 132 can have their bridges removed (e.g., exposing the corresponding portion of the cage 110 underneath). Alternatively, in some embodiments, structural integrity of the helmet 100 may be maintained without any bridges, e.g., such that all vents 126-134 include exposed portions of the cage 110.

Figure 2:
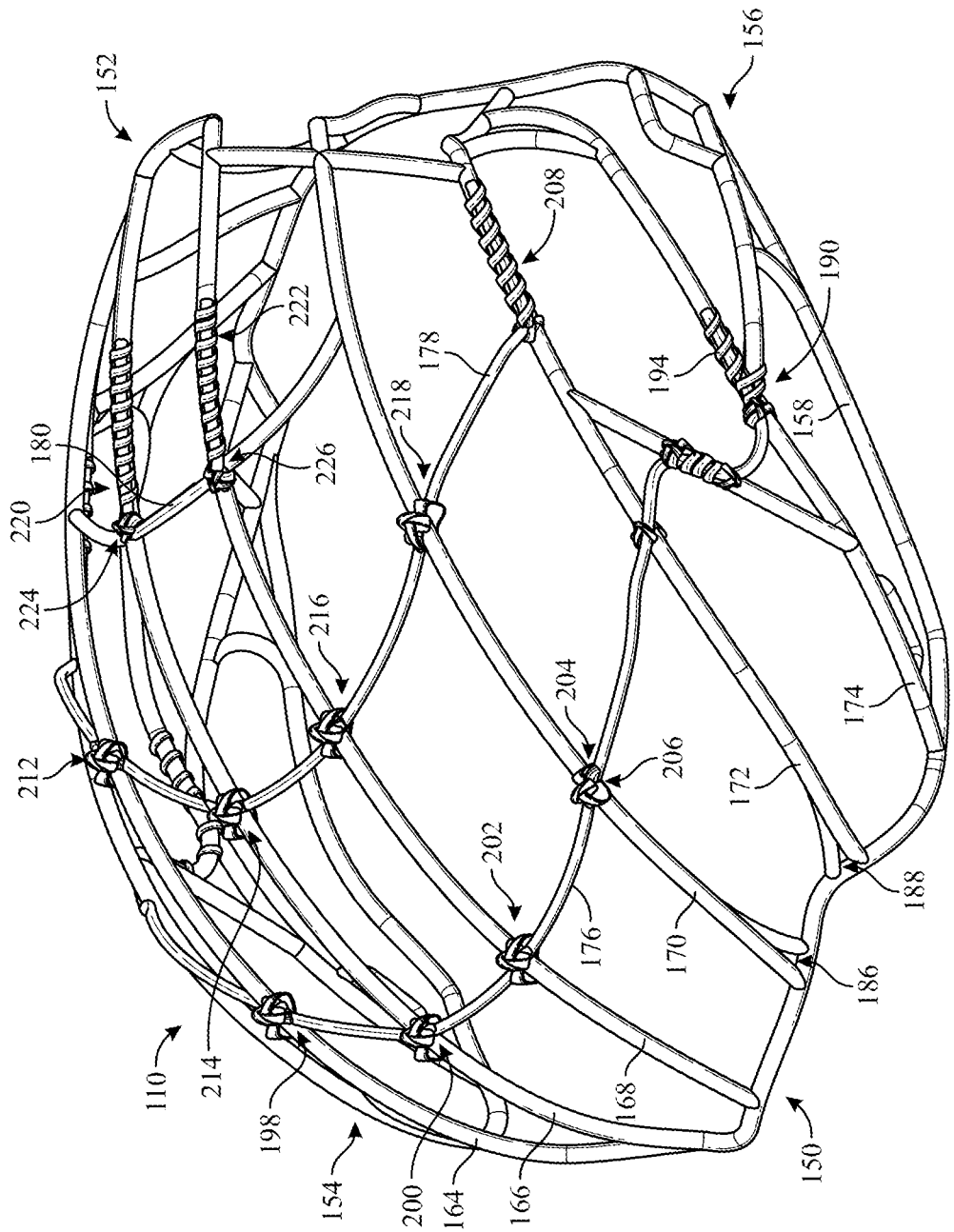
FIG. 2 shows a front isometric view of a cage of the helmet of FIG. 1 in an assembled configuration.
Figure 3:
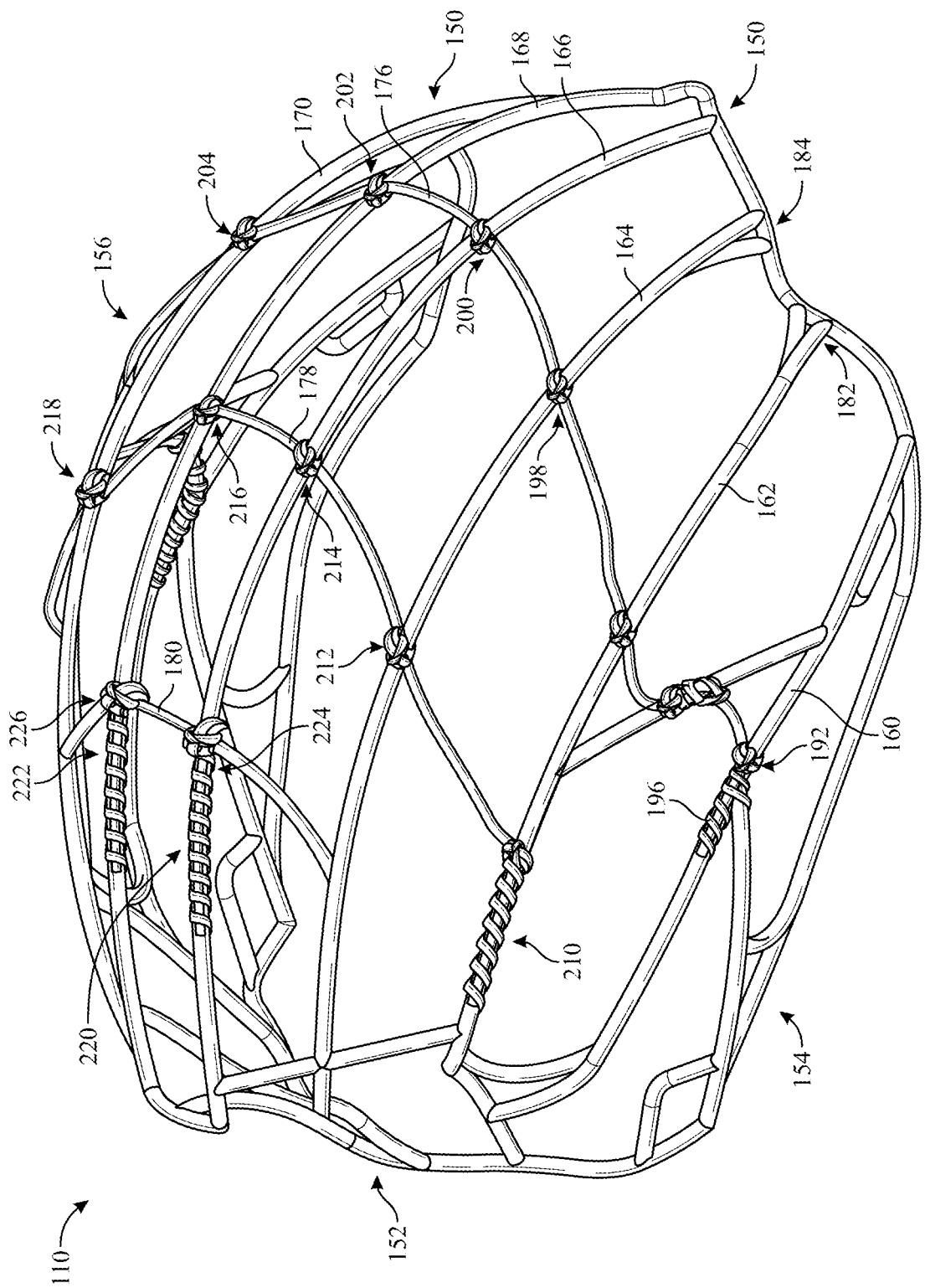
FIG. 3 shows a rear isometric view of the cage of FIG. 2, also in an assembled configuration.

FIG. 2 shows a front isometric view of the cage 110 in an assembled configuration, while FIG. 3 shows a rear isometric view of the cage 110 also in an assembled configuration. The cage 110 can define a front end 150, a rear end 152, and opposing lateral ends 154, 156. The cage 110 can include a rim 158, multiple longitudinal beams 160, 162, 164, 166, 168, 170, 172, 174, and multiple transverse beams 176, 178, 180. For example, in some embodiments, the number of longitudinal beams can be equal to or greater than the number of longitudinal ribs of the body 112. In some embodiments, the number of transverse beams can be equal to or greater than the number of bridges in a set of bridges extending across a vent.

As shown in FIGS. 2 and 3, one or more (e.g., each) longitudinal beam 160, 162, 164, 166, 168, 170, 172, 174 can be coupled to the rim 158 at the rear end 152 of the cage 110, can extend longitudinally towards the front end 150, and can be coupled to the rim 158 at the front end 150 of the cage 110. While the longitudinal beams 160, 162, 164, 166, 168, 170, 172, 174 are illustrated as being integrally formed with the rim 158, in some configurations, the longitudinal beams 160, 162, 164, 166, 168, 170, 172, 174 can be mechanically or otherwise coupled to the rim 158 (e.g., with fasteners, adhesive, ties, wrappings, etc.). In some embodiments, the longitudinal beams 160, 162, 164, 166, 168, 170, 172, 174 and the rim 158 can each be formed out of a single filament, which can be aramid. In some cases, ends of the longitudinal beams 160, 162, 164, 166, 168, 170, 172, 174 can be forked, with such ends being coupled (or integrally formed) with the rim 158. For example, each of the longitudinal beams 162, 164, 170, 172 have a respective forked end 182, 184, 186, 188 that is coupled (or integrally formed) with the rim 158. In this way, the forked ends 182, 184, 186, 188 can provide multiple securement locations on the rim 158 near the front end 150 of the cage 110, rather than just a single securement location.

As shown, the transverse beams 176, 178, 180 are separated from each other along the length of the helmet 100, and generally extend away from one lateral end 154 of the cage 110 and toward the other lateral end 156 of the cage 110. The transverse beams 176, 178, 180 are each coupled to one or more (e.g., at least two) of the longitudinal beams 160, 162, 164, 166, 168, 170, 172, 174. For example, as shown in FIG. 2, an end 190 of the transverse beam 176 can curve to contour (and be substantially (e.g., deviating by less than ±20%) parallel to) the longitudinal beam 174. As such, the transverse beam 176 generally extends from lateral end 154 to lateral end 156, while the end 190 extends towards the rear end 152 of the cage 110 and is coupled to the longitudinal beam 174 (e.g., using tie wrappings and/or adhesives). Similarly, an opposing end 192 of the transverse beam 176 curves and extends along to contour (and be substantially parallel to) the longitudinal beam 160. This opposing end 192 extends towards the rear end 152 of the cage 110 and is coupled to the longitudinal beam 160 (e.g., using tie wrappings and/or adhesives). For example, in addition to an adhesive (such as resin), strips of material 194, 196 (e.g., aramid), are spirally wound around the respective ends 190, 192 and the respective longitudinal beam 174, 160 or, alternatively, the strips of material 194, 196 illustrated in the figures represent the ends 190, 192 themselves being spirally wound around the respective longitudinal beam 174, 160. After winding, the strips of material 194, 196 are tied or otherwise secured (e.g., bonded) to reinforce the connection between the ends of the transverse beam 176 and the longitudinal beams 174, 160, thereby anchoring the transverse beam 176 to opposing ends 154, 156 of the cage 110.

In some embodiments, the transverse beam 176 is also coupled (e.g., with ties and/or an adhesive) to the longitudinal beams 164, 166, 168, 170 at respective coupling locations 198, 200, 202, 204. At each coupling location 198, 200, 202, 204 the transverse beam 176 can define a slot (e.g., by curving of the transverse beam 176) that receives the respective longitudinal beam. For example, at the coupling location 204, the transverse beam 176 has a groove 206 that receives the longitudinal beam 170. Also, at each coupling location 198, 200, 202, 204 a strip (e.g., a filament, thread, etc.) of material (e.g., aramid) is wrapped around both the transverse beam 176 and the respective longitudinal beam 164, 166, 168, 170 in a crisscross pattern, and is subsequently tied or otherwise secured (e.g., bonded) to reinforce the connection between the transverse beam 176 and the respective longitudinal beam 164, 166, 168, 170.

As shown in FIGS. 2 and 3, the transverse beams 178, 180 are coupled to their respective longitudinal beams in a similar manner as the transverse beam 176. For example, the transverse beam 178 also includes opposing ends 208, 210, which each curve to contour a corresponding longitudinal beam. That is, the end 208 of the transverse beam 178 curves to extend towards the rear end 152 of the cage 110, in a substantially parallel manner to the longitudinal beam 172. The end 208 is coupled to the longitudinal beam 172 (e.g., using an adhesive). Similarly, the end 210 of the transverse beam 178 also curves to extend towards the rear end 152 of the cage 110 in a substantially parallel manner to the longitudinal beam 162. The end 210 is coupled to the longitudinal beam 162 (e.g., using adhesives). Each of the opposing ends 208, 210 are also further secured by spirally wrapping a strip of material around the portions of the respective ends 208, 210 and the respective longitudinal beam 172, 162 or, alternatively, the ends 208, 210 themselves can replace these strips of material and are spirally wound around the respective longitudinal beam 172, 162. After winding the strips, each strip can be, for example, tied to reinforce the connection. The transverse beam 178 is also coupled (e.g., using an adhesive) to each of the longitudinal beams 164, 166, 168, 170 at respective coupling locations 212, 214, 216, 218. At each coupling location 212, 214, 216, 218 the transverse beam 178 defines a groove (e.g., by curving of the transverse beam 178) that receives the respective longitudinal beam. Additionally, at each coupling location 212, 214, 216, 218 a strip of material can be wrapped around both the transverse beam 178 and the respective longitudinal beam 164, 166, 168, 170 in a crisscross pattern. Once the strips of material are wrapped, each strip can be, for instance, tied to reinforce the connection.

Figure 4:
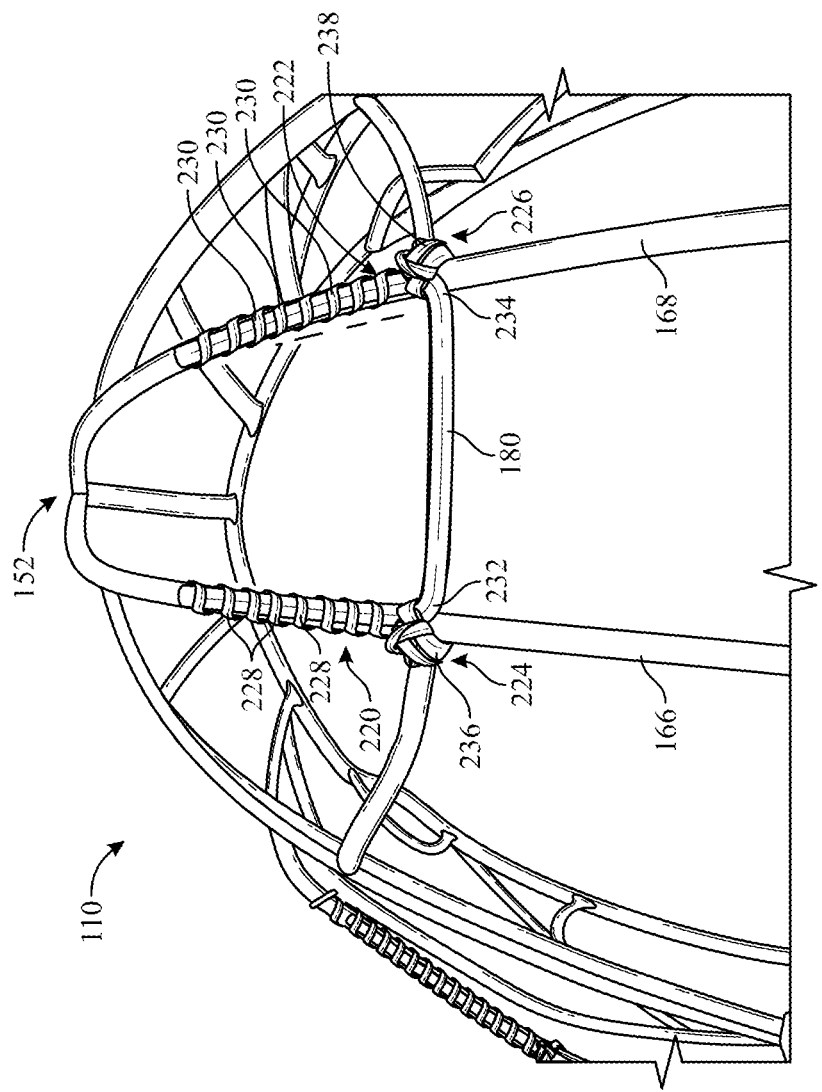
FIG. 4 shows a partial top isometric view of a transverse beam of the cage of FIG. 2 coupled to longitudinal beams of the cage.

The transverse beam 180 is situated as the rear-most transverse beam (e.g., farthest towards the rear end 152 of the cage 110), has a general u-shape, and rests on top of the longitudinal beams 166, 168. In particular, as shown in FIGS. 2-4, the transverse beam 180 has opposing ends 220, 222 that curve to contour and extend substantially parallel to a respective longitudinal member. That is, the end 220 of the transverse beam 180 extends towards the rear end 152 of the cage 110 in a substantially parallel manner to the longitudinal beam 162 and is coupled to the longitudinal beam 162 (e.g., using adhesives) along the entire length of the end 220 of the transverse beam 180. Similarly, the end 222 of the transverse beam 180 extends towards the rear end 152 of the cage 110 in a substantially parallel manner to the longitudinal beam 162 and is coupled to the longitudinal beam 162 (e.g., using adhesives) along the entire length of the end 222 of the transverse beam 180.

In some embodiments, the ends 220, 222 of the transverse beam 180 can be reinforced by spirally wrapping and tying a strip of material around each end 220, 222 and its respective longitudinal beam 166, 168. For example, as best shown in FIG. 4, a strip of material 228, which in this case is aramid, is wrapped spirally around both the transverse beam 180 and the longitudinal beam 166 and is tied or otherwise secured (e.g., bonded) to reinforce the connection between these components. Similarly, a strip of material 230, which in this case is also aramid, is wrapped spirally around both the transverse beam 180 and the longitudinal beam 168 and is tied or otherwise secured (e.g., bonded) to reinforce the connection between these components. Although the strips of material 228, 230 are spirally wound around the respective ends 220, 222 of the transverse beam 180 for substantially the entire length of the respective ends 220, 222, in other configurations the strips of material 228, 230 can be spirally wound around for different lengths along the respective ends 220, 222 (e.g., substantially halfway along, a fourth of the length of a respective end, etc.). Alternatively, the strips of material 228, 230 illustrated in the figures represent the ends 220, 222 themselves being spirally wound around the respective longitudinal beam 166, 168.

Additionally, the transverse beam 180 includes bends 232, 234, with the bend 232 coupled to the longitudinal beam 166 (e.g., using adhesive), and with the bend 234 coupled to the longitudinal beam 168 (e.g., using adhesive). That is, one bend 232 can be further coupled to the longitudinal beam 166 to define a coupling location 224, and an opposite bend 234 of the transverse beam 180 can be further coupled to the longitudinal beam 168 to define a coupling location 226.

Each of the coupling locations 224, 226 can be structurally reinforced by a strip (e.g., filament, thread, etc.) of material (e.g., aramid). For example, as shown in FIG. 4, a strip of material 236 can be wrapped around both the transverse beam 180 and the longitudinal beam 166 in a crisscross manner, and can be subsequently tied to reinforce the coupling location 224. Similarly, a strip of material 238 can be wrapped around both the transverse beam 180 and the longitudinal beam 168 in a crisscross manner, and can be subsequently tied or secured to reinforce the coupling location 226.

In some embodiments, at least part (e.g., all) of the transverse beams 176, 178, 180 can be braided filaments (e.g., aramid), which can better sustain tensile loading, and distribute forces throughout the cage 110, as described below. In some cases, the transverse beams 176, 178, 180 can be relatively thin, having a thickness that is less than or equal to substantially (or exactly) 2.5 mm. In some cases, the longitudinal beams 160, 162, 164, 166, 168, 170, 172, 174 and the rim 158 can also be relatively thin, having a thickness that is also less than or equal to substantially (or exactly) 2.5 mm, though at least part (e.g., all) of the longitudinal beams 160, 162, 164, 166, 168, 170, 172, 174 and the rim 158 may not be braided in some embodiments.

Figure 5:
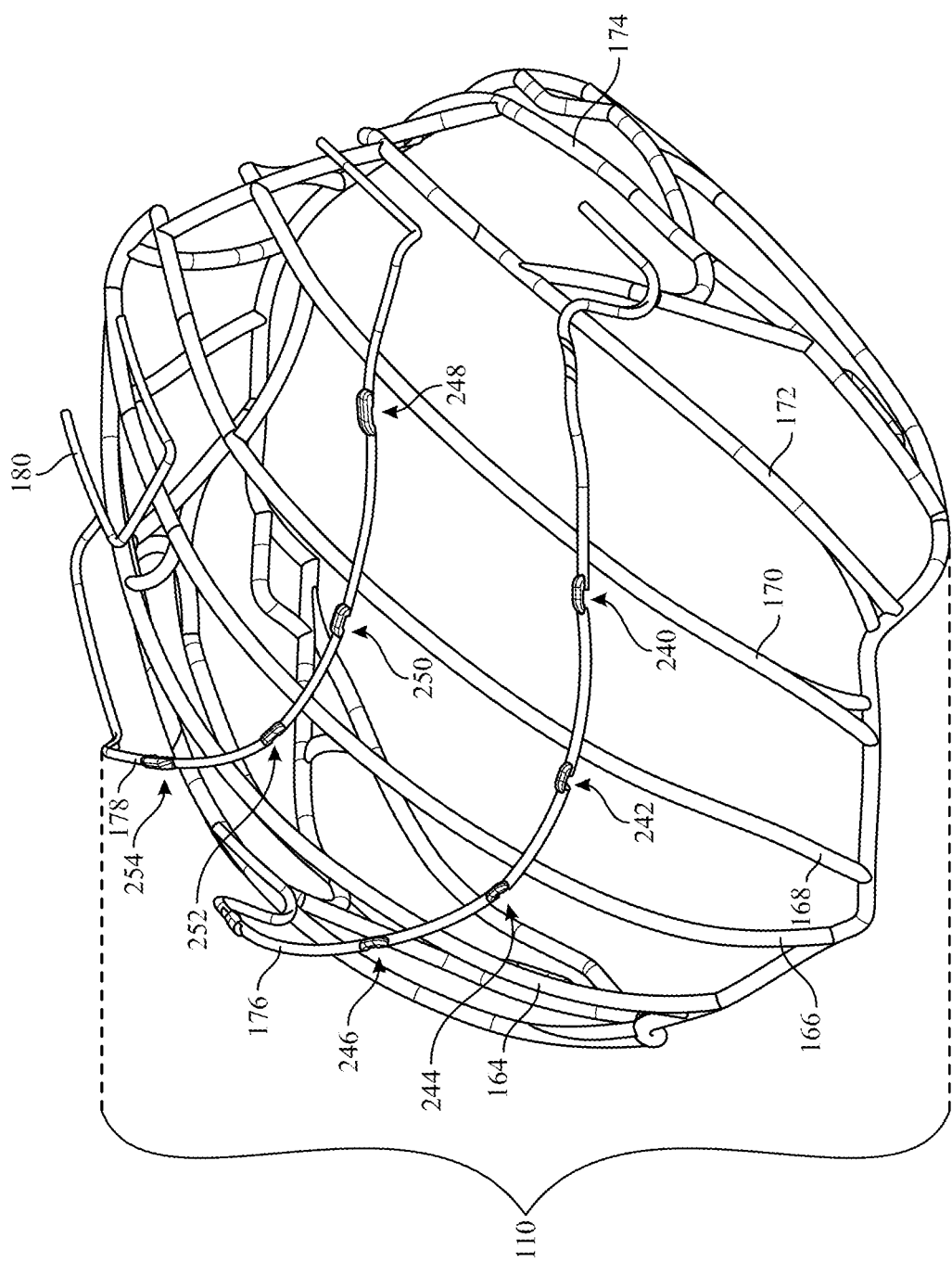
FIG. 5 shows an exploded perspective view of the cage of FIG. 2 with the transverse beams elevated from the longitudinal beams, and with the wrappings removed for visual clarity.

FIG. 5 shows an exploded perspective view of the cage 110 with the transverse beams 176, 178, 180 separated from the longitudinal beams 160, 162, 164, 166, 168, 170, 172, 174, and with the wrappings (e.g., at the coupling locations, and the ends of the transverse beams) removed for visual clarity. As shown, and described above, the transverse beams 176, 178 each have multiple grooves that each receive a corresponding longitudinal beam 160, 162, 164, 166, 168, 170, 172, 174. For example, the transverse beam 176 has grooves 240, 242, 244, 246, each of which respectively receives the longitudinal beam 164, 166, 168, 170. Similarly, the transverse beam 178 also has grooves 248, 250, 252, 254, each of which respectively receives the longitudinal beam 164, 166, 168, 170. In some cases, some or all of the grooves can be formed by the curvature of the transverse beams 176, 178 at the particular location.

In some embodiments, one or more (e.g., each) of the transverse beams 176, 178, 180 can be configured to be tensilely loaded. For example, when the end 190 of the transverse beam 176 is anchored to the longitudinal beam 174, the transverse beam 176 can be pulled in tension and the opposing end 192 of the transverse beam 176 can be anchored to the longitudinal beam 160. In some cases, when both ends 190, 192 are anchored to their respective longitudinal beam, each of the grooves 240, 242, 244, 246 can correspondingly receive each of their respective longitudinal beams without further manipulation of the transverse beam 176. In other cases, the transverse beam 176 can be manipulated (e.g., further pulled in tension) so that portions of the transverse beam 176 between adjacent grooves (and longitudinal beams when assembled) are tensilely loaded. Regardless of the configuration, when assembled, the transverse beam 176 can be tensilely loaded so that portions of the transverse beam 176 that extend between a pair of adjacent longitudinal beams force the adjacent longitudinal beams towards each other. In this way, the transverse beam 176 functions like a suspension bridge, better able to distribute loads throughout the cage 110. In some embodiments, the distance between adjacent grooves of the transverse beam 176 can be larger after coupling the transverse beam 176 to each of the longitudinal beams. In other words, the portion of the transverse beam 176 between adjacent grooves can be stretched after coupling the transverse beam 176 to the respective longitudinal beams, thereby generating tension in the assembled transverse beam 176.

In some embodiments, the transverse beam 178 can be assembled in a similar way to the transverse beam 176. For example, the end 208 of the transverse beam 178 can be anchored to the longitudinal beam 172, and the transverse beam 178 can be pulled in tension. With the transverse beam 178 pulled in tension (and urged toward a linear orientation), the opposing end 210 can be anchored to the longitudinal beam 162. Then, each of the grooves 248, 250, 252, 254 can receive and can be coupled to their respective longitudinal beam. Thus, adjacent longitudinal beams can be pulled closer together, via the tensilely loaded transverse beam 178. In some embodiments, the transverse beam 180 can also be assembled to be tensilely loaded. For example, the end 220 of the transverse beam 180 can be anchored to the longitudinal beam 166, and the transverse beam 180 can then be pulled in tension. With the transverse beam 180 pulled in tension, the opposing end 222 can be anchored to the longitudinal beam 168. In this way, because the transverse beam 180 is tensilely loaded, the longitudinal beams 166, 168 are pulled closer together.

Although the transverse beams 176, 178, 180 are illustrated as being separate components that are distinct and not connected, in other configurations, two or more of the transverse beams 176, 178, 180 can be connected to (or integrally formed with) each other. For example, the ends 190, 208, 222 can be coupled together with a beam (or integrally formed with a beam), and the ends 192, 210, 220 can be coupled together with a beam (or integrally formed with the beam). In this way, the ends 190, 208, 222 can be anchored to their respective longitudinal beams, and the respective transverse beams 176, 178, 180 can all be pulled in tension substantially in unison (e.g., at the same time). Then, with all the transverse beams 176, 178, 180 pulled together in tension, the ends 192, 210, 220 can be anchored to their respective longitudinal beam. In this way, each of the transverse beams 176, 178, 180 can have the substantially same amount of tensile loading, which can provide a more structurally sound cage 110.

Figure 6:
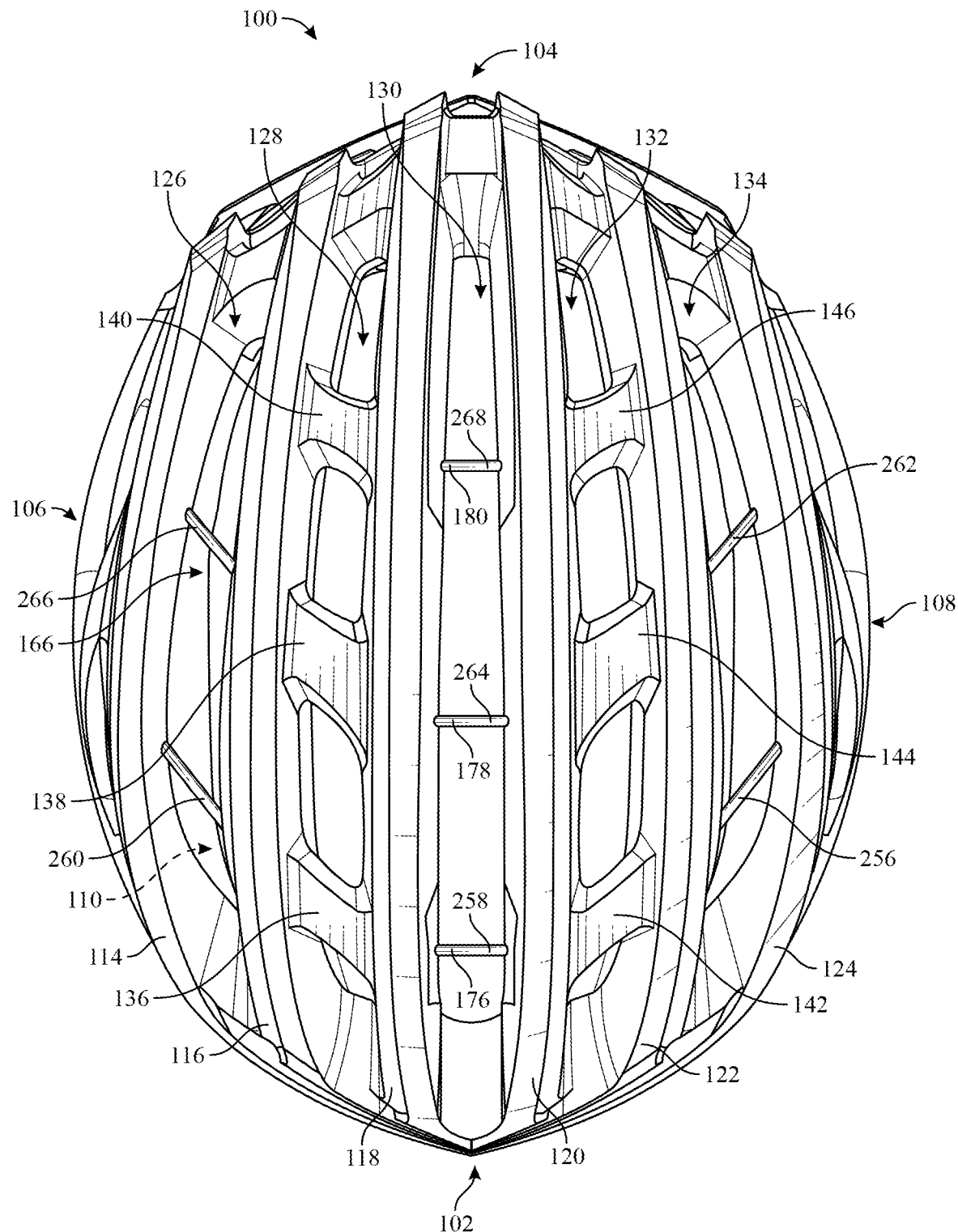
FIG. 6 shows a top view of the helmet of FIG. 1.

FIG. 6 shows a top view of the fully assembled helmet 100. In some embodiments, once the cage 110 is assembled, the entire (or a portion) of the cage 110 can be encapsulated in a resin layer (e.g., dipped in a liquid resin and allowed to solidify). Then, the body 112 can be assembled with the cage 110. In some cases, the cage 110 can be overmolded with the body 112, to deposit the body 112 about the cage 110 so that portions of the cage 110 are encapsulated within the body 112. For example, the cage 110 can be placed in a mold that has an interior surface that corresponds to the exterior surface of the body 112. In some cases, portions of the cage that are to be encapsulated with the material of the body 112 are placed between the interior surfaces of the mold but not in contact with these surfaces, while portions of the cage that are not to be encapsulated with the material of the body 112 engage and contact the interior surfaces of the mold. In this way, when the expandable material (e.g., EPS foam) is injected into the mold, the expandable material will fill in to contact the interior surfaces of the mold, thereby encapsulating portions of the cage 110. However, because the other portions of the cage 110 are already in contact with interior surfaces of the mold, the expandable material is prevented from encapsulating these portions of the cage 110, thus leaving them exposed. In some embodiments, the shell of the helmet 100 can be placed in the mold with the cage 110 and molded with body 112 at the same time as cage 110.

As shown in FIG. 6 and described above, the body 112 can partially encapsulate the cage 110. That is, the body 112 can fully encapsulate the cage 110 except for some portions of the transverse beams 176, 178, 180. As a more specific example, the rim 158 of the cage 110 is fully encapsulated by the body 112, and all the longitudinal beams 160, 162, 164, 166, 168, 170, 172, 174 are fully encapsulated by the body 112. Thus, each of the longitudinal ribs 114, 116, 118, 120, 122, 124 of the body 112 includes a respective encapsulated longitudinal beam 160, 162, 164, 166, 168, 170, 172, 174. Some portions of each of the transverse beams 176, 178, 180, are encapsulated by the body 112, while other portions are not encapsulated by the body 112 (e.g., do not include any portion of the body 112 surrounding it). For example, when assembled, a portion 256 of the transverse beam 176 extends entirely through the vent 134 and is not encapsulated by the body 112 (e.g., does not include any portion of the body 112 surrounding it), a portion (not shown) of the transverse beam 176 extends entirely through the vent 132 and is encapsulated by the body 112 to define the bridge 142, a portion 258 of the transverse beam 176 extends entirely through the vent 130 and is not encapsulated by the body 112, a portion (not shown) of the transverse beam 176 extends entirely through the vent 128 to define the bridge 142, and a portion 260 of the transverse beam 176 extends entirely through the vent 128 and is not encapsulated by the body 112.

Furthermore, in some embodiments, when assembled, a portion 262 of the transverse beam 178 extends entirely through the vent 134 and is not encapsulated by the body 112, a portion (not shown) of the transverse beam 178 extends entirely through the vent 132 and is encapsulated by the body 112 to define the bridge 144, a portion 264 of the transverse beam 178 extends entirely through the vent 130 and is not encapsulated by the body 112, a portion (not shown) of the transverse beam 178 extends entirely through the vent 128 to define the bridge 138, and a portion 266 of the transverse beam 178 extends entirely through the vent 128 and is not encapsulated by the body 112. Additionally, in some embodiments, when assembled, a portion 268 of the transverse beam 180 extends entirely through the vent 130 and is not encapsulated by the body 112.

As illustrated, the portions 256, 258, 260 of the transverse beam 176, the portions 262, 264, 266 of the transverse beam 178, and the portion 268 of the transverse beam 180 that are not encapsulated by any portion of the body 112 (or any other component except for the resin layer) are exposed to the ambient environment and can each have a thickness (e.g., substantially 2.5 mm) that is significantly smaller than the thicknesses of the bridges. In this way, the vents 126, 130, 134 provide a greater degree of ventilation (e.g., airflow) for the user during riding as compared to the vents 128, 132 that include bridges, thus improving overall ventilation of the helmet 100.

Although the thickness of the transverse beams 176, 178, 180 is uniform throughout its entire length, in other configurations, the thickness can vary throughout its length. For example, the portions 256, 258, 260 of the transverse beam 176 can have a smaller thickness than other portions of the traverse beam 176 (e.g., those are encapsulated by the body 112, such as a bridge). In this way, the cage 110 can be further reinforced to compensate for the relatively small amount of structural material that crosses the vents 126, 130, 134. In some cases, the portions 262, 264, 266 of the transverse beam 178 can have a smaller thickness than other portions of the transverse beam 178, and the portion 268 can have a smaller thickness than other portions of the transverse beam 180. For example, portions of the transverse beams 176, 178, 180 that are encapsulated by the body 112 can have a larger thickness than the portions of the transverse beams 176, 178, 180 that extend entirely through the one or more vents (e.g., that are not encapsulated by the body 112). In this way, the transverse beams 176, 178, 180 can be better anchored to the body 112 (e.g., at least due to an increase in surface area of the transverse beam), so as to better absorb (and distribute) forces when one or more of the exposed portions of the transverse beams 176, 178, 180 are contacted.

In some embodiments, because the exposed portions of the transverse beams 176, 178, 180 are tensilely loaded, when an object contacts one of these exposed portions, the helmet 100, and in particular the cage 110, is better able to distribute these contact forces throughout the helmet 100 (e.g., via the cage 110). For example, when a contact load is placed on one or more of the exposed portions of a transverse beam, it pulls its anchored locations on the cage 110 to distribute the load outside of the location of the contact load.

Figure 7:
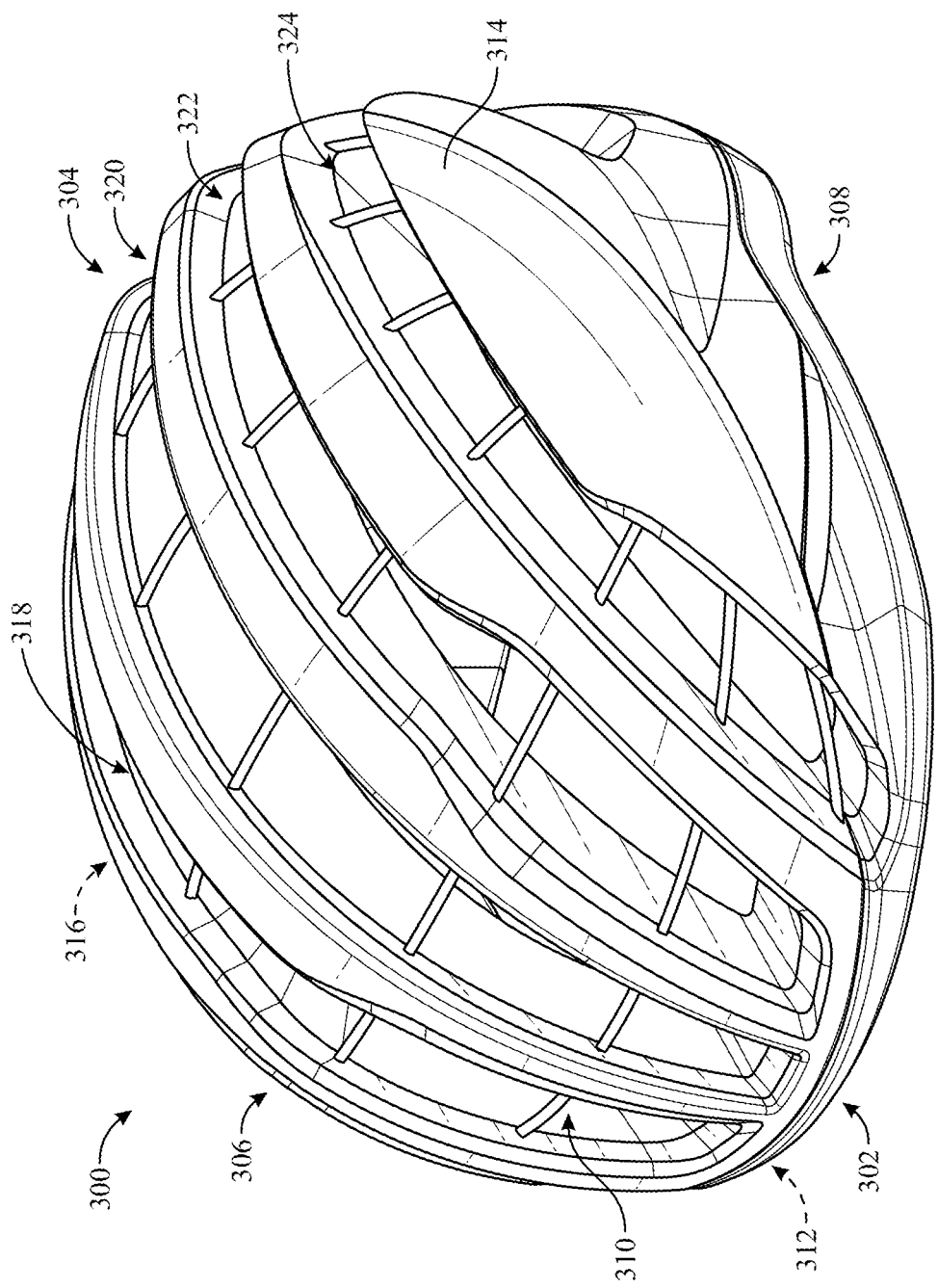
FIG. 7 shows a front isometric view of another helmet.

FIG. 7 shows a front perspective view of another helmet 300 according to some embodiments. The helmet 300 can define a front end 302, a rear end 304, and lateral ends 306, 308. The helmet 300 can include a cage 310, a body 312 that partially encapsulates the cage 310, and a shell 314 that is positioned on top of and is coupled to the body 312. The helmet 300 also includes vents 316, 318, 320, 322, 324, each of which extends longitudinally from the rear end 304 of the helmet 300 to the front end 302 of the helmet 300. As shown, portions of the cage 310 extend through each of the vents 316, 318, 320, 322, 324, as will be described in more detail below.

Figure 8:
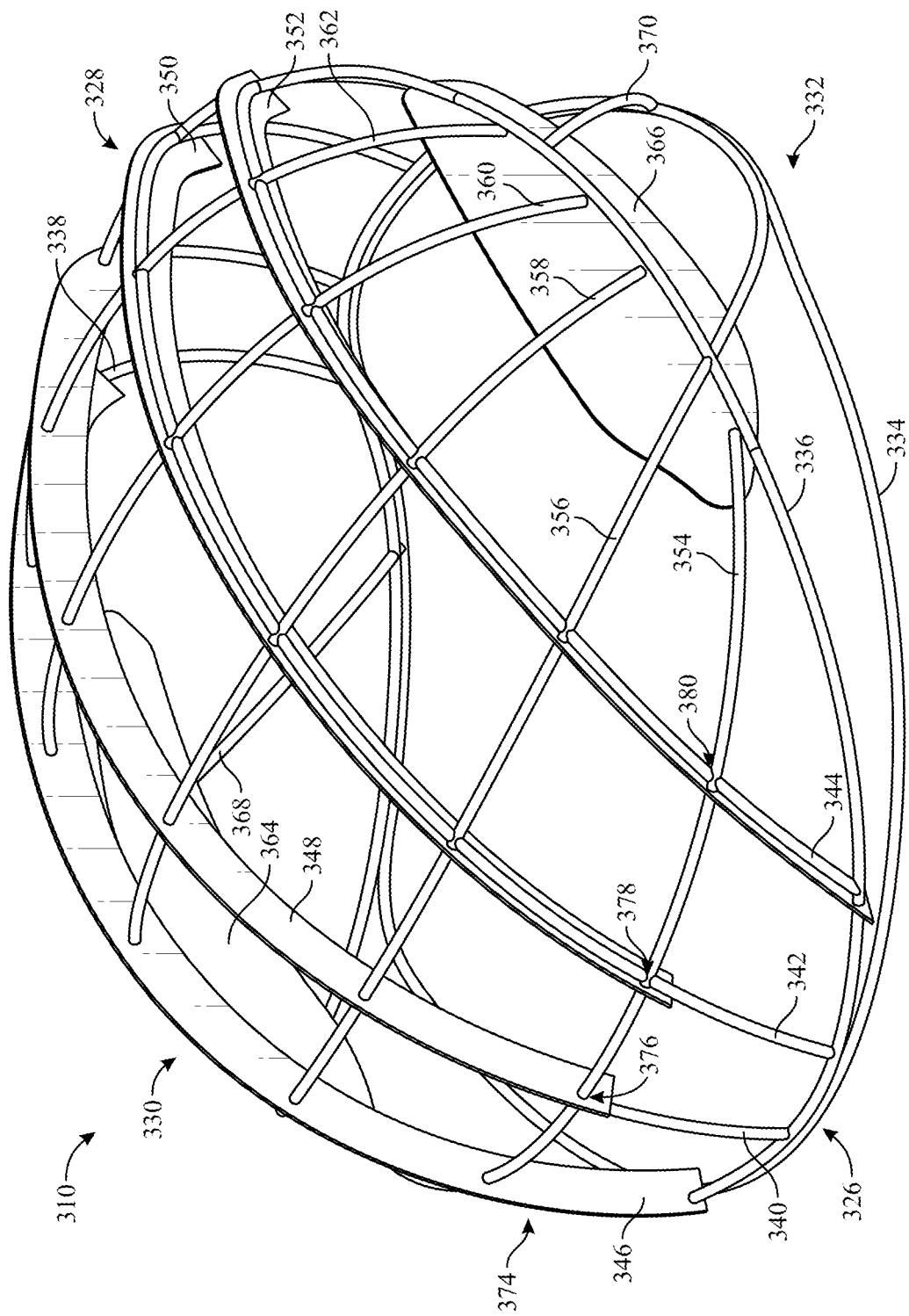
FIG. 8 shows a front isometric view of a cage of the helmet of FIG. 7.
Figure 9:
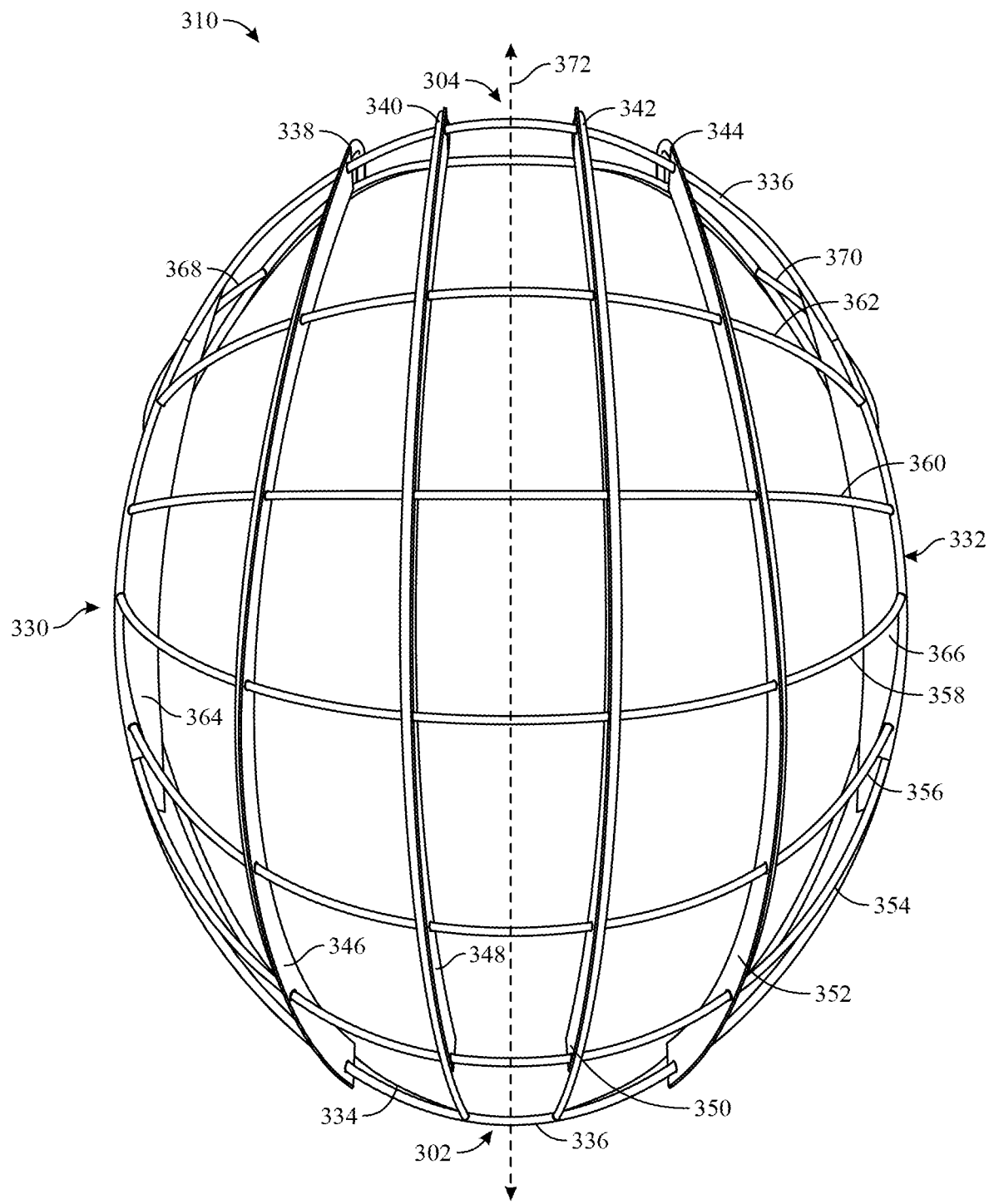
FIG. 9 shows a top view of the cage of FIG. 8.

FIG. 8 shows a front perspective view of the cage 310, and FIG. 9 shows a top view of the cage 310. The cage 310 defines a front end 326, a rear end 328, and opposing lateral ends 330, 332. The cage 310 can include one or more rims 334, 336, longitudinal beams 338, 340, 342, 344, fins 346, 348, 350, 352, transverse beams 354, 356, 358, 360, 362, plates 364, 366, and joists 368, 370. As shown, the rim 334 is an enclosed structure that extends around the lower periphery of the cage 310, and curves upwardly at the rear end 328 of the cage 310. Situated above the rim 334 is the rim 336, which is also an enclosed structure having an oval shape. In some cases, the rims 334, 336 can be coupled together (e.g., mechanically or chemically bonded) at the front end 326 of the cage 310.

In some embodiments, one or more (e.g., each) longitudinal beams 338, 340, 342, 344 extends in a longitudinal direction away from the rear end 328 of the cage 310 and towards (e.g., to) the front end 326 of the cage 310. As shown, one or more (e.g., each) longitudinal beams 338, 340, 342, 344 can be coupled to one or both rims 334, 336. In particular, each longitudinal beam 338, 340, 342, 344 has a front end that is coupled to the rim 336 at the front end 326 of the cage 310, and a rear end that is coupled to the rim 334 at the rear end 328 of the cage 310. Additionally, each longitudinal beam 338, 340, 342, 344 can be coupled to the rim 334 at a location between its front and rear ends. In some cases, one or more (e.g., each) of the longitudinal beams 338, 340, 342, 344 can be formed out of a single filament or a braided filament (such as aramid).

In some embodiments one or more (e.g., each) longitudinal beams 338, 340, 342, 344 can have a respective fin 346, 348, 350, 352, that is coupled to and is positioned on a side of the longitudinal beam 338, 340, 342, 344. For example, the fins 346, 348, 350, 352 can be coupled to the side closer to a central axis 372 of the cage 310 (e.g., the central axis 372 extending in a direction from the rear end 304 to the front end 302 of the cage 310, as shown in FIG. 9). Each fin 346, 348, 350, 352 can extend below and above its respective longitudinal beam 338, 340, 342, 344, and can be formed out of a different material than the longitudinal beams 338, 340, 342, 344. For example, one or more fins 346, 348, 350, 352 can be formed out of a rigid material (e.g., carbon fiber), while one or more longitudinal beams 338, 340, 342, 344 can be formed out of a more flexible material (e.g., aramid), such as a single filament of the flexible material. The fins 346, 348, 350, 352 are illustrated as being planar, plate-like structures that are curved along the longitudinal direction from the rear end 328 to the front end 326 of the cage 310. However, in other configurations, the fins 346, 348, 350, 352 can be structured in other ways, such as being other three-dimensional shapes. Furthermore, in some embodiments, each fin 346, 348, 350, 352 can comprise multiple layers that are coupled to a respective beam by being sandwiched around either side of the beam and, in some embodiments, then the layers are coupled together.

In some embodiments, and as shown, one or more (e.g., each) of the transverse beams 354, 356, 358, 360, 362 can extend through one or more (e.g., each) of the fins 346, 348, 350, 352 (e.g., through an opening or a hole in the fin). Additionally, one or more (e.g., each) of the transverse beams 354, 356, 358, 360, 362 can be coupled to one or more (e.g., each) of the longitudinal beams 338, 340, 342, 344 (e.g., using adhesive) to define a coupling location. For example, the transverse beam 354 extends through each of the fins 346, 348, 350, 352, and is coupled to each of the longitudinal beams 338, 340, 342, 344, each of which defines a respective coupling location 374, 376, 378, 380. The locations at which each of the other traverse beams 354, 356, 358, 360, 362 are coupled to each of the longitudinal beams 338, 340, 342, 344 can also be defined as coupling locations. In some embodiments, these coupling locations can be structured in a similar manner as the coupling locations of the cage 110 of the helmet 100, as described above with respect to FIGS. 1-6. For example, at each coupling location, a strip of material (e.g., aramid) can be wrapped in a crisscross manner around both the respective longitudinal beam and the respective transverse beam. After the strip of material is wrapped, the strip can be tied or otherwise bonded to reinforce the connection between the beams.

While one or more of the transverse beams 354, 356, 358, 360, 362 can be structured in a similar manner (e.g., having substantially the same length, thickness, etc.), in some embodiments, the transverse beam 356 may be structured in a different manner. For example, the transverse beam 356 can be part of an enclosed ring that extends past the rim 336 and curves to contour the rim 334, then extends upwardly in a curved manner towards the rear end 328 of the cage 310. However, in some configurations, the transverse beam 356 can be structured in a similar manner as the other transverse beams 354, 358, 360, 362—that is, as a truncated beam rather than an enclosed ring.

In some embodiments, the transverse beams 354, 356, 358, 360, 362 can have a uniform thickness (e.g., less than or equal to substantially 2.5 mm) along their length, as shown. In other configurations, the thicknesses of each of the transverse beams 354, 356, 358, 360, 362 can vary along its length. In some embodiments, the transverse beams 354, 356, 358, 360, 362 can be formed of a single filament of a flexible material, while in other embodiments, the transverse beams 354, 356, 358, 360, 362 can be a braided filament, which can be formed out of a flexible material (e.g., braided aramid). Regardless of the configuration, the transverse beams 354, 356, 358, 360, 362 can be tensilely loaded, thereby pulling or urging two adjacent longitudinal beams 338, 340, 342, 344 closer together. In some cases, when the transverse beams 354, 356, 358, 360, 362 are formed out of the braided filament, these beams can withstand a greater tensile loading, while still providing a relatively strong connection. In some embodiments, because the transverse beams 354, 356, 358, 360, 362 (and the rim 336) are tensilely loaded, when an object contacts these beams or rim, the transverse beams or rim are better able to accommodate and distribute the forces throughout the helmet 300, in a similar manner as described above with respect to helmet 100.

Referring back to FIG. 8, the plates 364, 366 can be situated along opposing ends 330, 332 of the cage 310 and are coupled to one or more of (e.g., each of) the transverse beams 354, 356, 358, 360, 362, and the rim 336. For example, the plate 364 is situated on the lateral end 330 of the cage 310, while the plate 366 is situated on the opposing lateral end 332 of the cage 310. A first lateral end of each of the transverse beams 354, 358, 360, 362 is coupled to the plate 364 (e.g., with adhesive), and a first lateral portion of the rim 336 that is positioned under each of the first lateral ends of the transverse beams is coupled to the plate 364. The transverse beam 356, which is structured as an enclosed loop, has a first portion that is coupled to the plate 364. Additionally, the plate 364 extends above and below the first portion of the rim 336. Furthermore, in some embodiments, the plate 364 can comprise multiple layers that are coupled to the beams by being sandwiched around either side of the beams and, in some embodiments, then the layers are coupled together. For example, the plate 364 can comprise a first plate positioned along an interior of the cage 310 at the lateral end 330, as shown in FIG. 8, and a second, substantially identical plate positioned along an exterior of the cage 310 at the lateral end 330 (not shown).

The plate 366 is configured in a similar manner as the plate 364. For example, a second opposite lateral end of each of the transverse beams 354, 358, 360, 362 is coupled to the plate 366 (e.g., with adhesive), and a second opposite lateral portion of the rim 336 that is positioned under each of the second opposite lateral ends of the transverse beams is coupled to the plate 366. The transverse beam 356, which is structured as an enclosed loop, has a second opposite portion that is coupled to the plate 366. Additionally, the plate 366 extends above and below the second portion of the rim 336. Furthermore, in some embodiments, the plate 366 can comprise multiple layers that are coupled to the beams by being sandwiched around either side of the beams and, in some embodiments, then the layers are coupled together. For example, the plate 366 can comprise a first plate positioned along an interior of the cage 310 at the lateral end 332, as shown in FIG. 8, and a second, substantially identical plate positioned along an exterior of the cage 310 at the lateral end 332 (not shown).

In some embodiments, each of the plates 364, 366 can form a bowl shape, having one end curved towards the rear end 328 of the cage 310 and an opposing end curved towards the front end 326 of the cage 310. In other configurations, however, the plates 364, 366 can embody other shapes. Additionally, in some embodiments, the plates 364, 366 can be formed out of substantially rigid materials (e.g., carbon fiber).

Referring still to FIG. 8, the joists 368, 370 can be elongated beams that are each connected to a respective one of the plates 364, 366 and the rim 334. For example, one end of the joist 368 is coupled to the plate 364, and an opposing end of the joist 368 is coupled to the rim 334. Similarly, one end of the joist 370 is coupled to the plate 366 and an opposing end of the joist 370 is coupled to the rim 334. In some embodiments, the ends of the joists 368, 370 that are coupled to the rim 334 can also be coupled to a portion of the transverse beam 356, thus enhancing and strengthening the rear end connection of each of the joists 368, 370.

In some cases, the joists 368, 370 can be beneficial in that they can provide a more uniform tensile loading of the transverse beams 354, 356, 358, 360, 362, which can be repeatable during the manufacturing process. For example, because the length of each joist 368, 370 between the rim 334 and the respective plate 364, 366 can determine the tensile loading of each of the transverse beams 354, 356, 358, 360, 362, during manufacturing, the plate 364 can be pulled towards the lateral end 330 and the plate 366 can be pulled towards the lateral end 332, each of which tensilely loads the transverse beams 354, 356, 358, 360, 362. Then, when the desired position of each of the plates 364, 366 is reached (e.g., which can be symmetric about the central axis 372 of the cage 310), the respective joist 368, 370 can be coupled to the respective plate 364, 366 and the rim 334 to fix the current position of the plates 364, 366. Thus, this configuration provides a repeatable tensioning process for the transverse beams 354, 356, 358, 360, 362 during the manufacturing process.

Furthermore, in some embodiments, the configuration of the plates 364, 366 can provide advantages to tensioning of the transverse beams 354, 356, 358, 360, 362. For example, because each of the transverse beams 354, 356, 358, 360, 362 are coupled to both plates 364, 366 (at respective ends), pulling or other movement of the plate 364, 366 can simultaneously tensilely load all the transverse beams 354, 356, 358, 360, 362. Thus, this can ensure that each transverse beam 354, 356, 358, 360, 362 has the same amount of tensile loading, or that the tensile loading between the same transverse beam 354, 356, 358, 360, 362 for multiple cages 310 is the same (e.g., the tensile loading of a transverse beam 354 of the helmet 300 and the tensile loading of another transverse beam 354 of another helmet 300 is substantially the same). As such, this configuration can provide a highly repeatable tensioning process during manufacturing, ensuring that multiple cages 310 in a production line have similar tensile characteristics.

Figure 10:
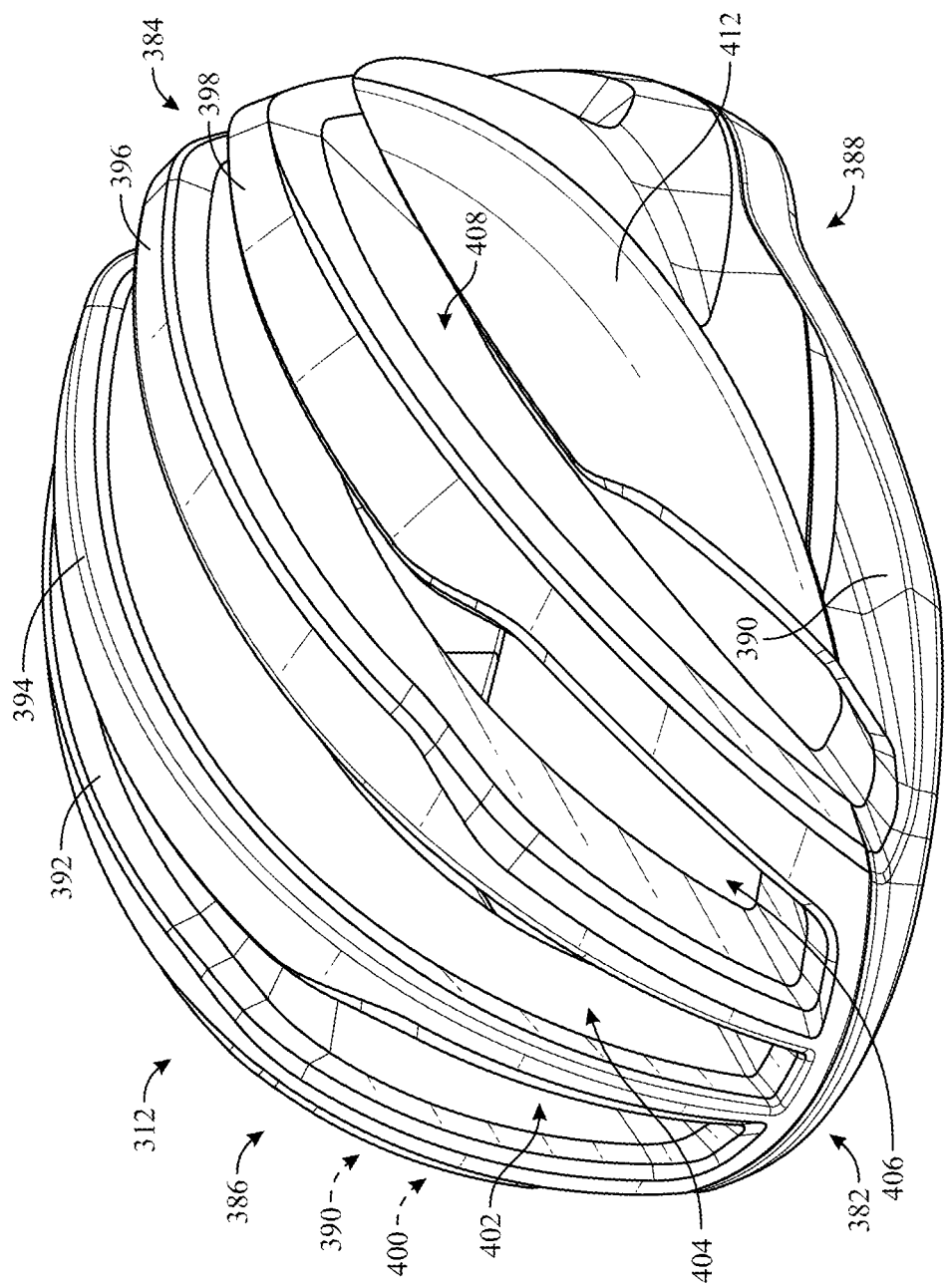
FIG. 10 shows a front isometric view of a body of the helmet of FIG. 7.

Referring now to the body 312 of the helmet 300, FIG. 10 shows a front perspective view of the body 312. As described in more detail below, the body 312 at least partially encapsulates some portions of the cage 310. In some embodiments, the body 312, similarly to the body 112 of FIGS. 1-6, can be formed out of an expansive foam polymer (e.g., EPS foam). The body 312 can define a front end 382, a rear end 384, and opposing lateral ends 386, 388. The body 312 can also include a rim 390 situated around the periphery of the body 312, longitudinal ribs 392, 394, 396, 398, and longitudinal openings 400, 402, 404, 406, 408 that are defined between adjacent longitudinal ribs 392, 394, 396, 398, or between the rim 390 and a longitudinal rib 392, 394, 396, 398.

As shown, each of the longitudinal ribs 392, 394, 396, 398 generally extends away from the rear end 384 and towards the front end 382 of the body 312, and has a varying thickness along its length in the longitudinal direction. For example, the thickness of one or more (e.g., each) of the longitudinal ribs 392, 394, 396, 398 is relatively uniform near the back end 384, but may gradually decrease near the front end 382 of the body 312. In some cases, and as illustrated, the decrease in thickness can be due to a curved cutout that extends longitudinally on one or both lateral sides of each of the longitudinal ribs 392, 394, 396, 398. For example, the longitudinal rib 392 has a curved longitudinal cutout on its lateral side that is closer to the longitudinal center of the body 312, while the longitudinal rib 398 also has a curved longitudinal cutout on its lateral side that is closer to the longitudinal center of the body 312. The longitudinal ribs 394, 396, which are situated between the longitudinal ribs 392, 398 each have a curved longitudinal cutout on both of their lateral sides. In some embodiments, the rim 390 can have a portion 410 (shown in FIG. 14) that extends upwardly and is situated closer to the lateral end 386 of the body 312, and a portion 412 (shown in FIGS. 10 and 14) that also extends upwardly and is situated closer to the lateral end 388 of the body 312. In some cases, each of the portions 410, 412 of the rim 390 can have a curved longitudinal cutout situated closer to the front end 382 of the body 312 and on its lateral side that is closer to the longitudinal center of the body 312.

As shown, the longitudinal openings 400, 402, 404, 406, 408 extend in a longitudinal direction away from the rear end 384 of the body 312 and towards the front end 382 of the body 312. Each of the longitudinal openings 400, 402, 404, 406, 408 can be situated between adjacent longitudinal ribs 392, 394, 396, 398, or a longitudinal rib 392, 394, 396, 398 and the rim 390. For example, the longitudinal opening 400 is situated between a portion 410 of the rim 390 along the lateral end 386 and the longitudinal rib 392, the longitudinal opening 402 is situated between the longitudinal ribs 392, 394, the longitudinal opening 404 is situated between the longitudinal ribs 394, 396, the longitudinal opening 406 is situated between the longitudinal ribs 396, 398, and the longitudinal opening 408 is situated between the longitudinal rib 398 and a portion 412 of the rim 390 along the lateral end 388. As described below, each longitudinal opening 400, 402, 404, 406, 408 corresponds to and partially defines a respective vent 316, 318, 320, 322, 324 of the helmet 300 and, thus, each of the longitudinal openings 400, 402, 404, 406, 408 also receives the transverse beams 354, 356, 358, 360, 362 (e.g., each of the transverse beams 354, 356, 358, 360, 362 extend entirely through each of the longitudinal openings 400, 402, 404, 406, 408).

Figure 11:
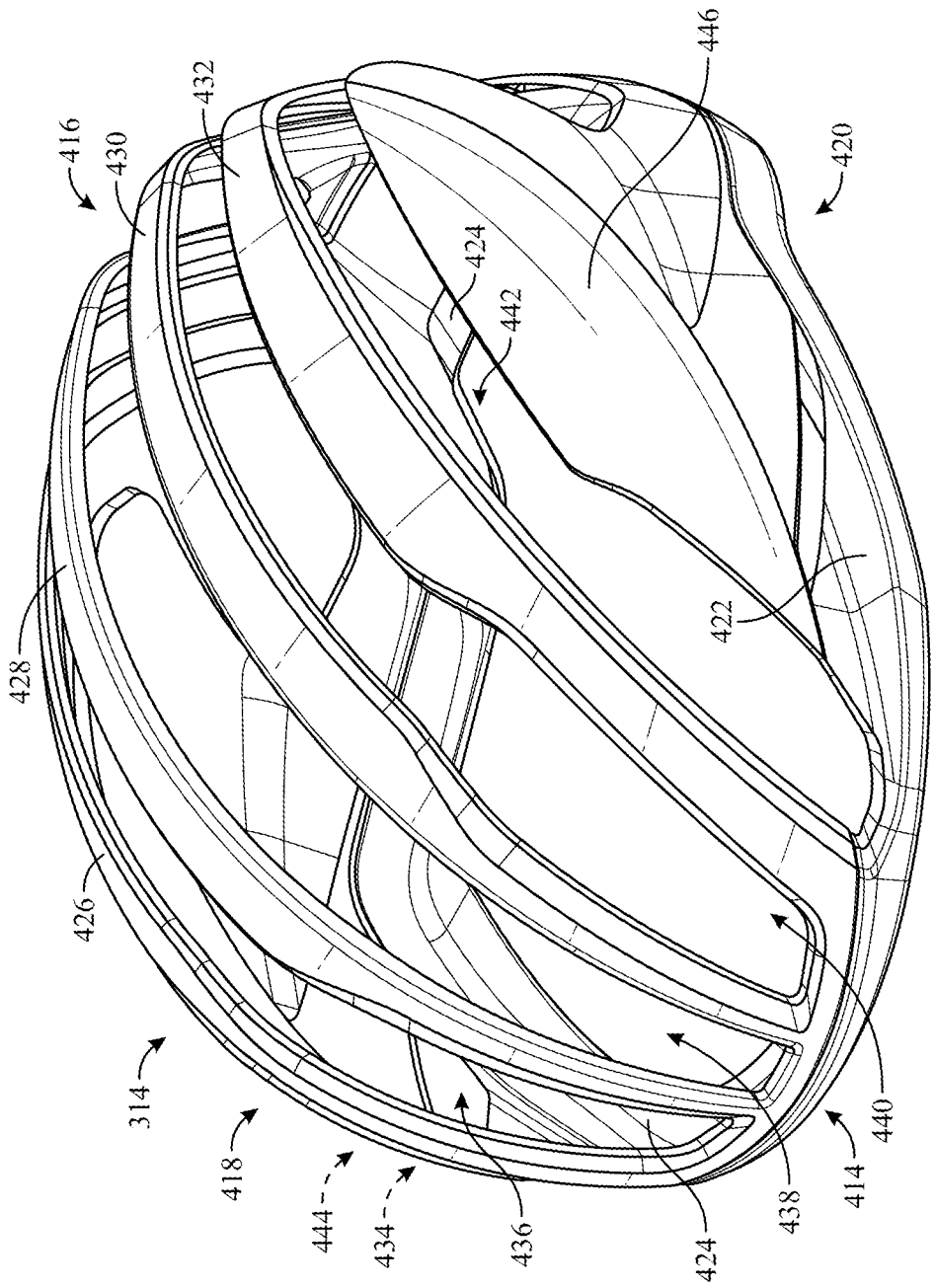
FIG. 11 shows a front isometric view of a shell of the helmet of FIG. 7.

FIG. 11 shows a front perspective view of the shell 314 of the helmet 300. When assembled, the shell 314 is positioned on top of the body 312, and the shell 314 can be formed out of a different material as the body 312 and the cage 310 (e.g., a material that has a greater hardness). For example, the shell 314 can be formed out of a relatively rigid material (e.g., a plastic, such as polycarbonate). The shell 314 can define a front end 414, a rear end 416, and opposing lateral ends 418, 420. The shell 314 can include a rim 422 that extends around the periphery of the shell 314, a peripheral flange 424 that is coupled to (or integrally formed with) the rim 422 and which extends internally towards the center of the shell 314, longitudinal strips 426, 428, 430, 432, and longitudinal openings 434, 436, 438, 440, 442 that are defined either between two adjacent longitudinal strips 426, 428, 430, 432, or a longitudinal strip 426, 428, 430, 432 and a portion of the rim 422. When assembled, each longitudinal strip sits on top of and is coupled to a respective longitudinal rib of the body 312. For example, the longitudinal strip 426 is coupled to and seated on top of the longitudinal rib 392, the longitudinal strip 428 is coupled to and seated on top of the longitudinal rib 394, the longitudinal strip 430 is coupled to and seated on top of the longitudinal rib 396, and the longitudinal strip 432 is coupled to and seated on top of the longitudinal rib 398. Similarly, a portion 444 of the rim 422 positioned near the lateral end 418 of the shell 314 is coupled to the portion 410 of the rim 390 of the body 312. An opposing portion 446 of the rim 422 positioned near the lateral end 420 of the shell 314 is coupled to the portion 412 of the rim 390 of the body 312.

In some embodiments, when assembled, the peripheral flange 424 of the shell 314 is coupled to the body 312 and extends under the rim 390 of the body 312 towards the center of the helmet 300. In this way, the peripheral flange 424 can help to retain the shell 314 to the body 312, so that the coupling mechanism (e.g., an adhesive) between the shell 314 and the body 312 is not the only feature fastening these components together. In other words, the peripheral flange 424 of the shell 314 helps to restrict relative movement between the shell 314 and the body 312.

Figure 12:
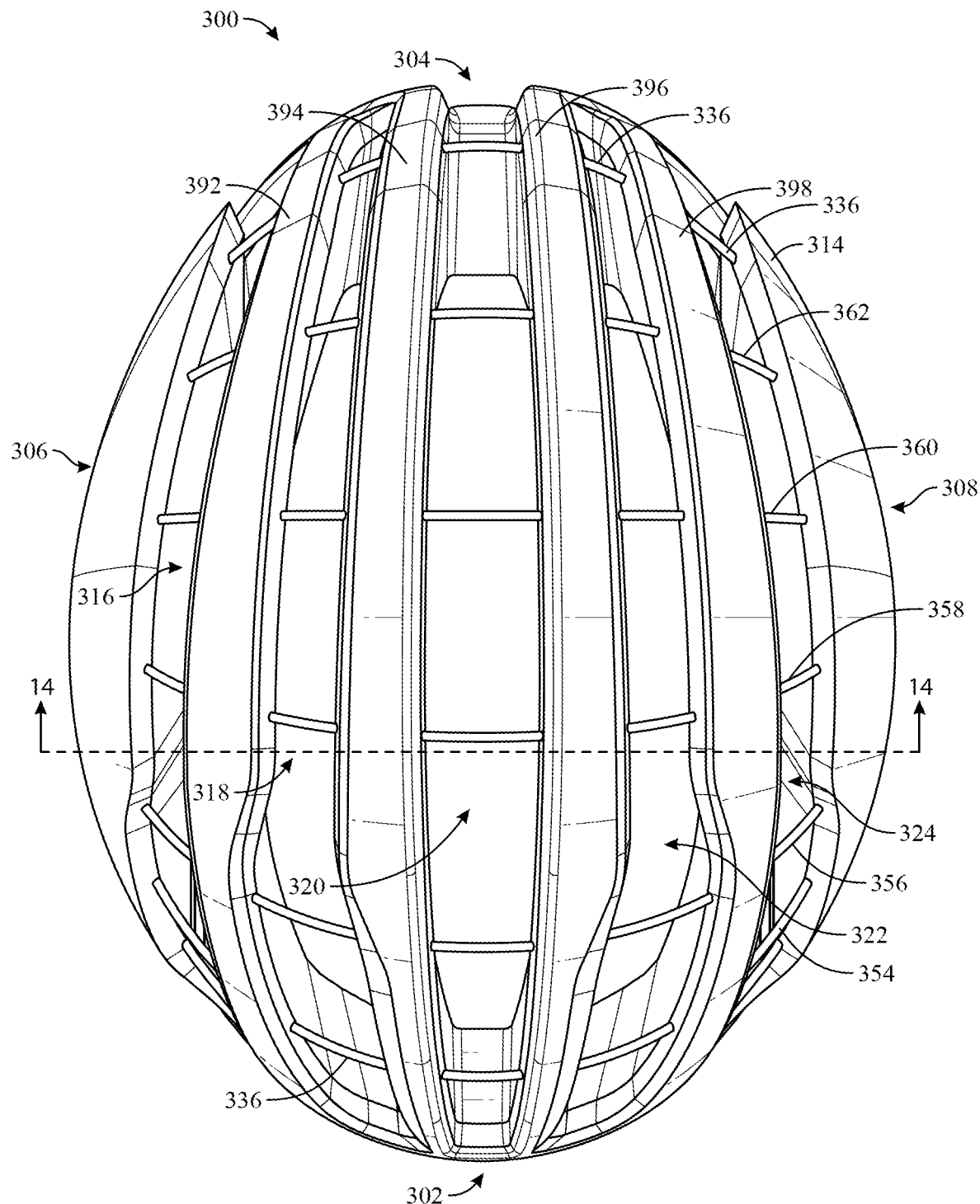
FIG. 12 shows a top view of the helmet of FIG. 7.

FIG. 12 shows a top view of the helmet 300 in an assembled configuration. In some embodiments, similarly to the helmet 100, once the cage 310 is assembled, portions of (or the entirety of) cage 310 can be encapsulated in a resin layer (e.g., dipped in a liquid resin and allowed to solidify). Then, the body 312 can be assembled with the cage 310. More specifically, the cage 310 can be assembled with the fins 346, 348, 350, 352 and the plates 364, 366, and then the body 312 molded over the assembled cage 310. However, in some cases, the body 312 can be pre-formed and can include slots that are each configured to receive a respective plate 364, 366, or a respective fin 346, 348, 350, 352. In other words, a slot can be directed into the interior surface of each of the longitudinal ribs 392, 394, 396, 398 and the portions 410, 412 of the rim 390. Then, each of the fins 346, 348, 350, 352 can be inserted into a respective slot of the respective longitudinal rib, and each of the plates 364, 366 can be inserted into a respective slot of the portions 410, 412 of the rim 390. Additionally, the rims 334, 336 can be inserted into the same or a respective slot of the body 312. In this way, the body 312 can be easily slid on top of the cage 310 to assemble the body 312 to the cage 310.

In some embodiments, similarly to the helmet 100 of FIGS. 1-6, the cage 310 can be overmolded with the body 312, to deposit the body 312 about the cage 310 so that portions of the cage 310 are entirely encapsulated within the body 312. For example, the cage 310 can be placed in a mold that has a surface that corresponds to the exterior surface of the body 312. In some cases, portions of the cage 310 that are to be encapsulated with the material of the body 312 are placed between the interior surfaces of the mold, but not in contact with these surfaces of the mold, while portions of the cage that are not to be encapsulated with the material of the body 312 engage and contact the interior surfaces of the mold. In this way, when the expandable material (e.g., EPS foam) is injected into the mold, the expandable material will fill in to contact the interior surfaces of the mold thereby encapsulating portions of the cage 310. However, because the portions of the cage 310 are already in contact with interior surfaces of the mold, the expandable material is prevented from encapsulating this portion of the cage 310. Regardless of how the cage 310 and the body 312 are coupled together, once these are assembled, the shell 314 is placed on top of and is coupled to the body 312. In some embodiments, the shell 314 of the helmet 300 can be placed in the mold with the cage 310 and molded with the body 312 at the same time as the cage 310.

As shown in FIG. 12, the body 312 at least partially encapsulates the cage 310. That is, the body 312 fully encapsulates the cage 310 except for some portions of the rim 336 and the transverse beams 354, 356, 358, 360, 362. As a more specific example, the rim 334 is fully encapsulated by the body 312, and all the longitudinal beams 338, 340, 342, 344 are fully encapsulated by the body 312. Thus, each of the longitudinal ribs 392, 394, 396, 398 includes a respective encapsulated longitudinal beam 338, 340, 342, 344. As illustrated, some portions of the rim 336 and each of the transverse beams 354, 356, 358, 360, 362 are encapsulated by the body 312, while other portions are not encapsulated by the body 312 (e.g., do not include any portion of the body 312 surrounding it).

For example, when assembled, a portion of the front region of the rim 336 extends entirely through the vent 316 and is not encapsulated by the body 312 (e.g., does not include any portion of the body 312 surrounding it), a portion of the front region of the rim 336 extends entirely through and is encapsulated by the longitudinal rib 392 of the body 312, a portion of the front region of the rim 336 extends entirely though the vent 318 and is not encapsulated by the body 312, a portion of the front region of the rim 336 extends entirely through and is encapsulated by the longitudinal rib 394 of the body 312, a portion of the front region of the rim 336 extends entirely though the vent 320 and is not encapsulated by the body 312, a portion of the front region of the rim 336 extends entirely through and is encapsulated by the longitudinal rib 396 of the body 312, a portion of the front region of the rim 336 extends entirely though the vent 322 and is not encapsulated by the body 312, a portion of the front region of the rim 336 extends entirely through and is encapsulated by the longitudinal rib 398 of the body 312, and a portion of the front region of the rim 336 extends entirely though the vent 324 and is not encapsulated by the body 312.

In some embodiments, each of transverse beams 354, 356, 358, 360, 362 can be structured with the body 312 in a similar way. For example, a portion of each of the transverse beams 354, 356, 358, 360, 362 extends entirely through the vent 316 and is not encapsulated by the body 312 (e.g., does not include any portion of the body 312 surrounding it), a portion of each of the transverse beams transverse beams 354, 356, 358, 360, 362 extends entirely through and is encapsulated by the longitudinal rib 392 of the body 312, a portion of each of the transverse beams transverse beams 354, 356, 358, 360, 362 extends entirely though the vent 318 and is not encapsulated by the body 312, portion of each of the transverse beams 354, 356, 358, 360, 362 extends entirely through and is encapsulated by the longitudinal rib 394 of the body 312, portion of each of the transverse beams 354, 356, 358, 360, 362 extends entirely though the vent 320 and is not encapsulated by the body 312, portion of each of the transverse beams 354, 356, 358, 360, 362 extends entirely through and is encapsulated by the longitudinal rib 396 of the body 312, portion of each of the transverse beams 354, 356, 358, 360, 362 extends entirely though the vent 322 and is not encapsulated by the body 312, portion of each of the transverse beams 354, 356, 358, 360, 362 extends entirely through and is encapsulated by the longitudinal rib 398 of the body 312, and a portion of each of the transverse beams 354, 356, 358, 360, 362 extends entirely though the vent 324 and is not encapsulated by the body 312.

Furthermore, in some embodiments, a rear region of the rim 336 can be structured relative to the body 312 in a similar manner as the front region of the rim 336. For example, a portion of the rear region of the rim 336 extends entirely through the vent 316 and is not encapsulated by the body 312 (e.g., does not include any portion of the body 312 surrounding it), a portion of the rear region of the rim 336 extends entirely through and is encapsulated by the longitudinal rib 392 of the body 312, a portion of the rear region of the rim 336 extends entirely though the vent 318 and is not encapsulated by the body 312, a portion of the rear region of the rim 336 extends entirely through and is encapsulated by the longitudinal rib 394 of the body 312, a portion of the rear region of the rim 336 extends entirely though the vent 320 and is not encapsulated by the body 312, a portion of the rear region of the rim 336 extends entirely through and is encapsulated by the longitudinal rib 396 of the body 312, a portion of the rear region of the rim 336 extends entirely though the vent 322 and is not encapsulated by the body 312, a portion of the rear region of the rim 336 extends entirely through and is encapsulated by the longitudinal rib 398 of the body 312, and a portion of the rear region of the rim 336 extends entirely though the vent 324 and is not encapsulated by the body 312.

As shown, the portions of each of the transverse beams 354, 356, 358, 360, 362 that extend entirely through each of the vents 316, 318, 320, 322, 324 are not encapsulated by the body 312. Thus, from the rear end 304 of the helmet 300 to the front end 302 of the helmet 300 only the relatively thin transverse beams 354, 356, 358, 360, 362, which can each be substantially 2.5 mm in thickness (e.g., diameter when defining a generally circular transverse cross-section), extend between adjacent longitudinal ribs 392, 394, 396, 398 (or a longitudinal rib 392, 394, 396, 398 and a portion of the rim 290). In other words, aside from the transverse beams 354, 356, 358, 360, 362 there are no structures (e.g., bridges) that connect adjacent longitudinal ribs 392, 394, 396, 398 together (or a longitudinal rib 392, 394, 396, 398 to a portion of the rim 390). In this way, the vents 316, 318, 320, 322, 324 can provide enhanced ventilation as only relatively thin cage segments abrupt the flow of air through a vent 316, 318, 320, 322, 324.

Figure 13:
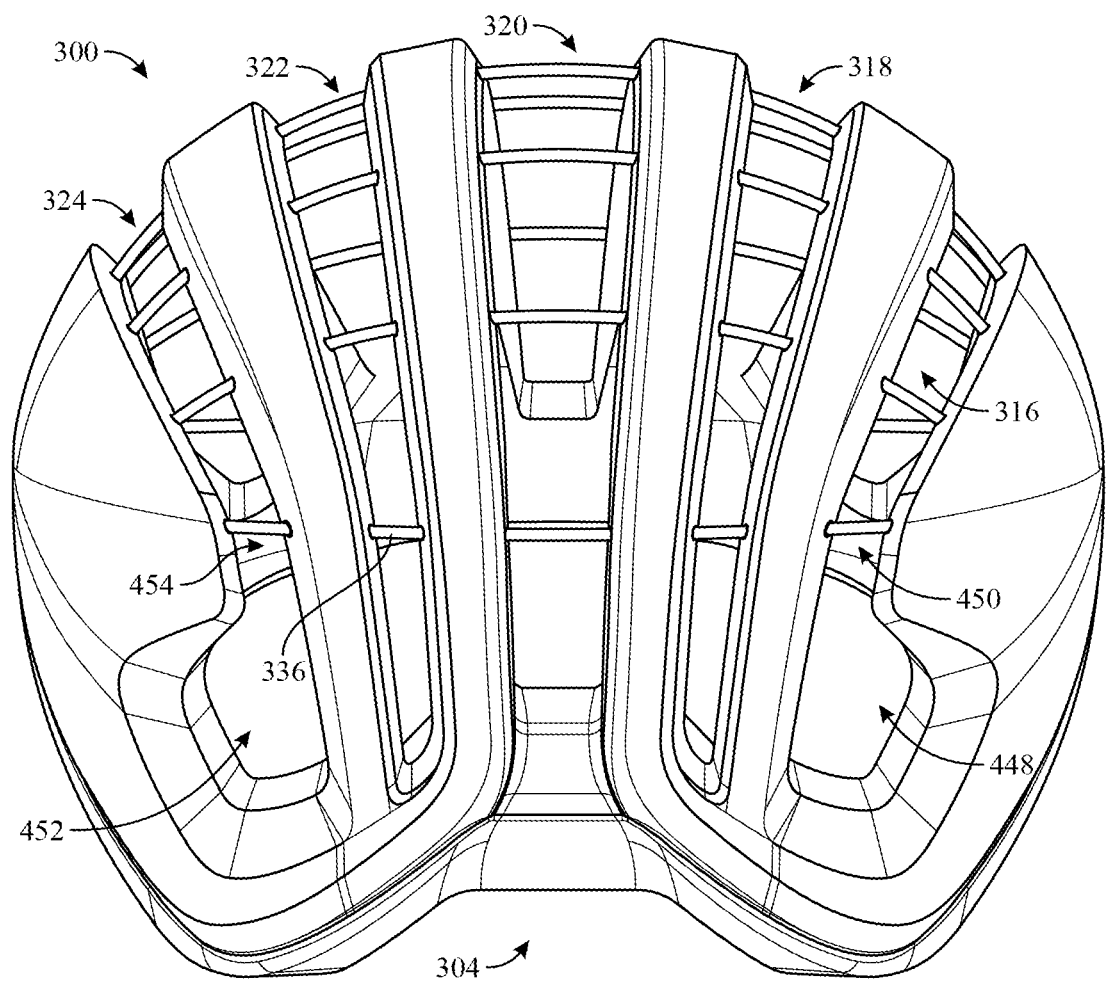
FIG. 13 shows a rear view of the helmet of FIG. 7.

FIG. 13 shows a rear view of the helmet 300. As shown, the rear ends of each of the vents 316, 324 have a cutout that is thicker than other regions of the respective vent 316, 324 (e.g., such as a centrally located region of the vent that is halfway along its length). For example, the vent 316 has a cutout 448 at its ear end, which is positioned rearwardly from a narrowed region 450 of the vent 316. Similarly, the vent 324 also has a cutout 452 at its rear end, which is positioned rearwardly from a narrowed region 454 of the vent 324. Although the cutouts are illustrated as having a rectangular shape with curved edges, in other configurations, the cutouts 448, 452 can have different shapes. In some cases, and as illustrated, the rear region of the rim 336 extends through each of the vents 316, 324 at the narrowed regions 450, 454. For example, the narrowed regions 450, 454 can be narrower (e.g., have a smaller width than) other portions of the respective vent 316, 324 (e.g., such as a region of the respective vent that is halfway along its length). Similarly, the rim 336 also extends through each of the remaining vents 318, 320, 322 at a region that has a smaller width than other portions of the respective vent (e.g., such as a region of the respective vent that is halfway along its length).

Figure 14:
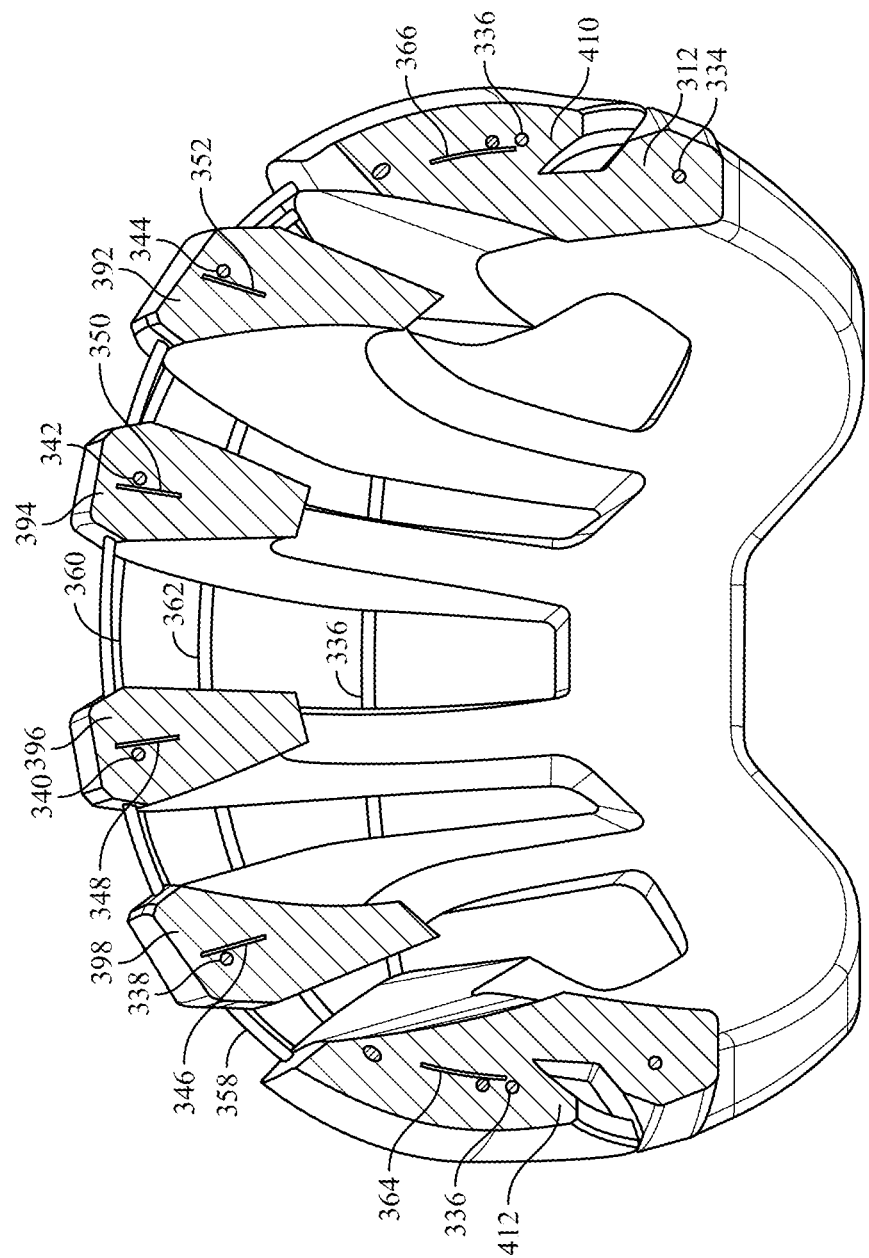
FIG. 14 shows a cross-sectional view of the helmet of FIG. 7 taken along line 14-14 of FIG. 12.

FIG. 14 shows a cross-sectional view of the helmet 300 taken along line 14-14 of FIG. 12. As shown, each of the fins 346, 348, 350, 352 is encapsulated entirely within and is generally situated at or near the middle of the respective longitudinal ribs 398, 396, 394, 392, while each of the plates 364, 366 is also encapsulated entirely within and is also generally situated at or near the middle of the respective portion 412, 410 of the rim 390 of the body 312. In this way, because the fins 346, 348, 350, 352 and the plates 364, 366 are entirely encapsulated by the body 312, the interfaces between the body 312 and the fins 346, 348, 350, 352 and the plates 364, 366 are enhanced (e.g., stronger). Additionally, because the fins 346, 348, 350, 352 and the plates 364, 366 are entirely encapsulated by the body 312, the tensilely loaded transverse beams 354, 356, 358, 360, 362 are less prone to being pulled through a longitudinal rib or the rim (or pulling a longitudinal beam of the cage 310 through a longitudinal rib). In other words, there is a greater surface area between the cage 310 and a given longitudinal rib of the body 312 (or the portion of the rim of the body), which enforces the interface between these components.

Figure 15:
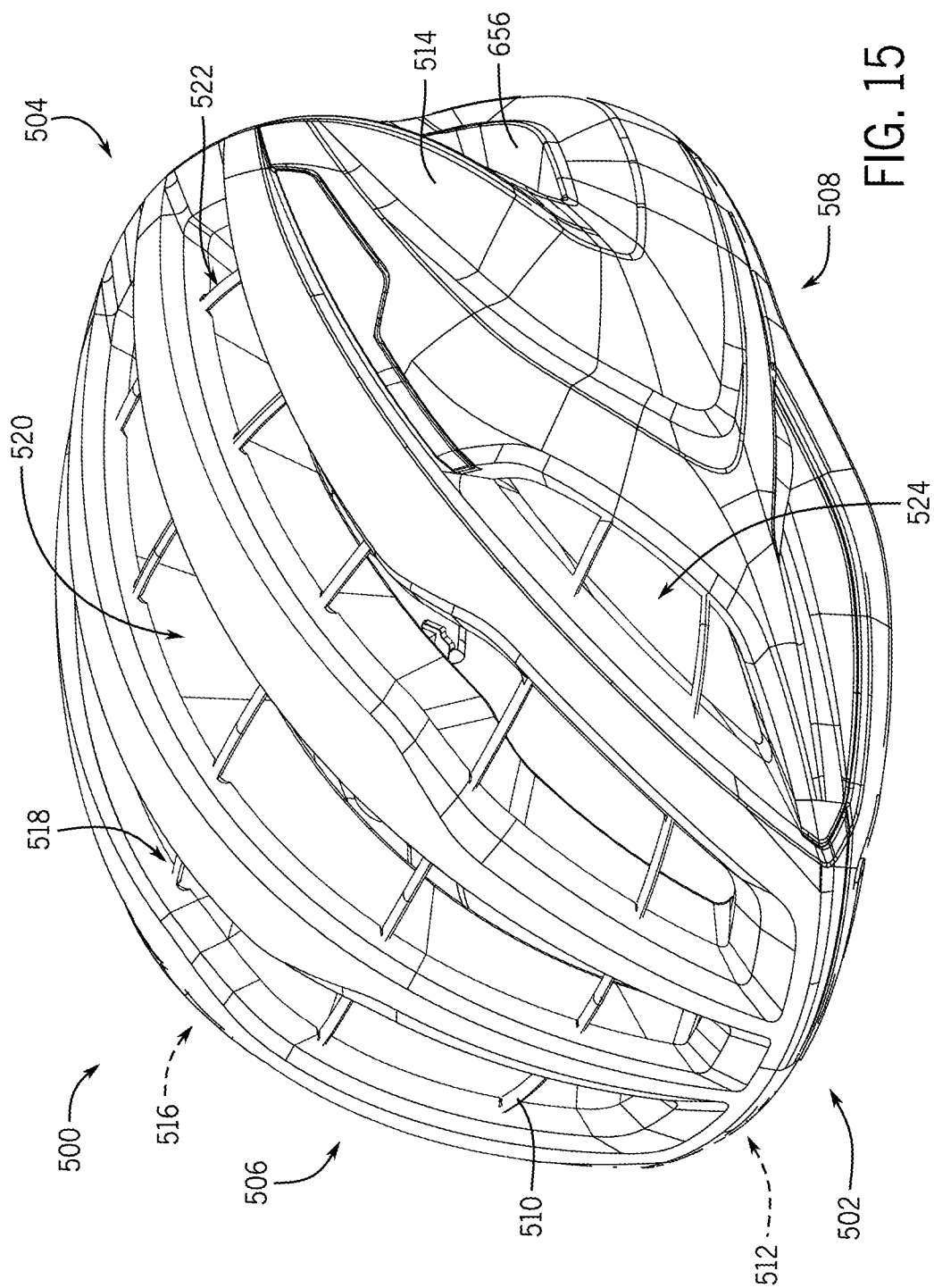
FIG. 15 shows a front isometric view of another helmet.

FIG. 15 shows a front isometric view of another helmet 500 according to some embodiments. The helmet 500 can define a front end 502, a rear end 504, and lateral ends 506, 508. The helmet 500 can include a cage 510, a body 512 that partially encapsulates the cage 510, and a shell 514 that is positioned on top of and is coupled to the body 512. The helmet 500 also includes vents 516 (shown in FIG. 19), 518, 520, 522, 524, each of which extends longitudinally between the rear end 504 of the helmet 500 and the front end 502 of the helmet 500. As shown, one or more of the vents 516, 518, 520, 522, 524, may not extend an entire length of the helmet 500 from the rear end 504 to the front end 502 but, rather, may only extend a portion of the length of the helmet 500. Furthermore, as shown, portions of the cage 510 extend through each of the vents 516, 518, 520, 522, 524.

Figure 16:
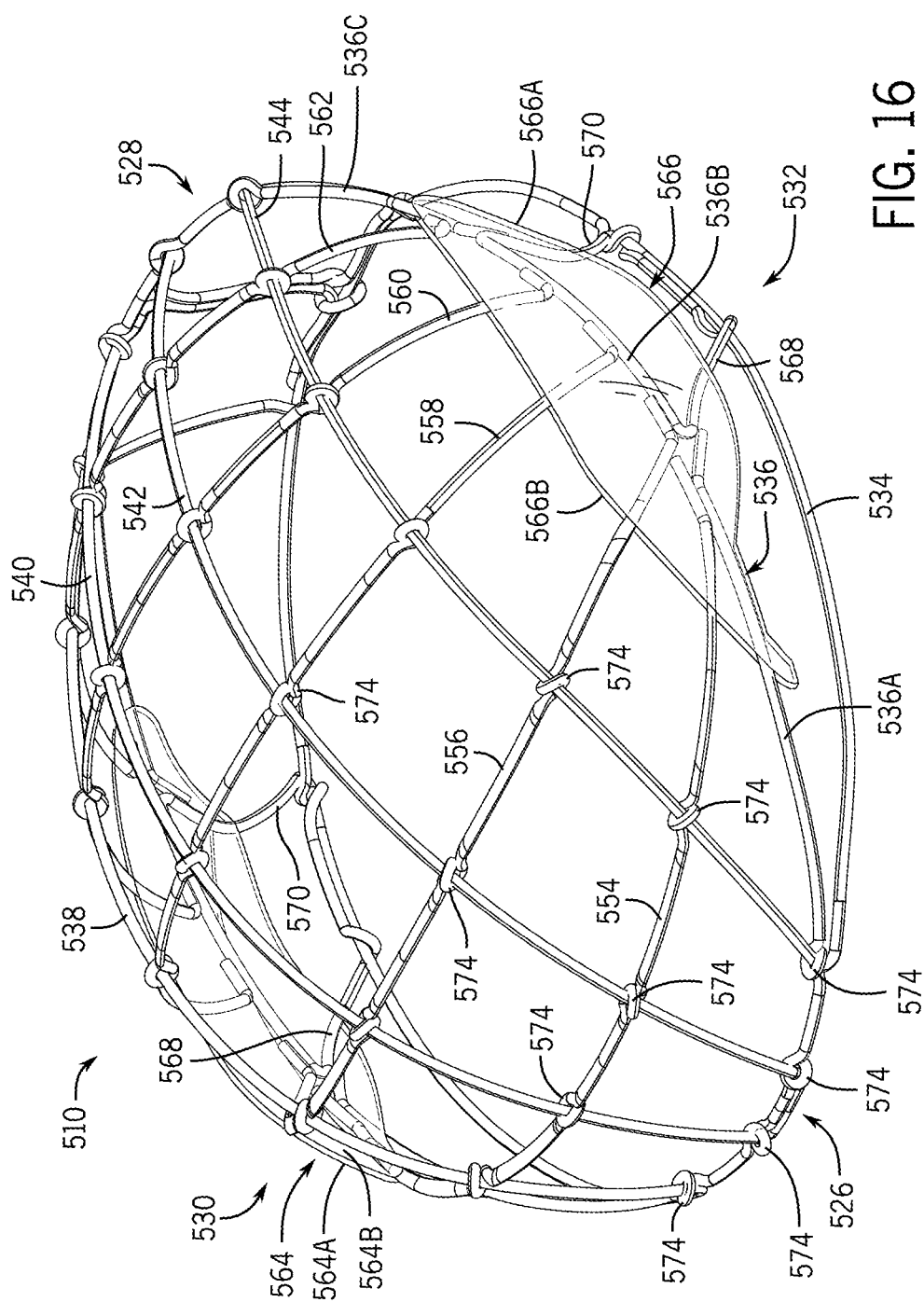
FIG. 16 shows a front isometric view of a cage of the helmet of FIG. 15.
Figure 17:
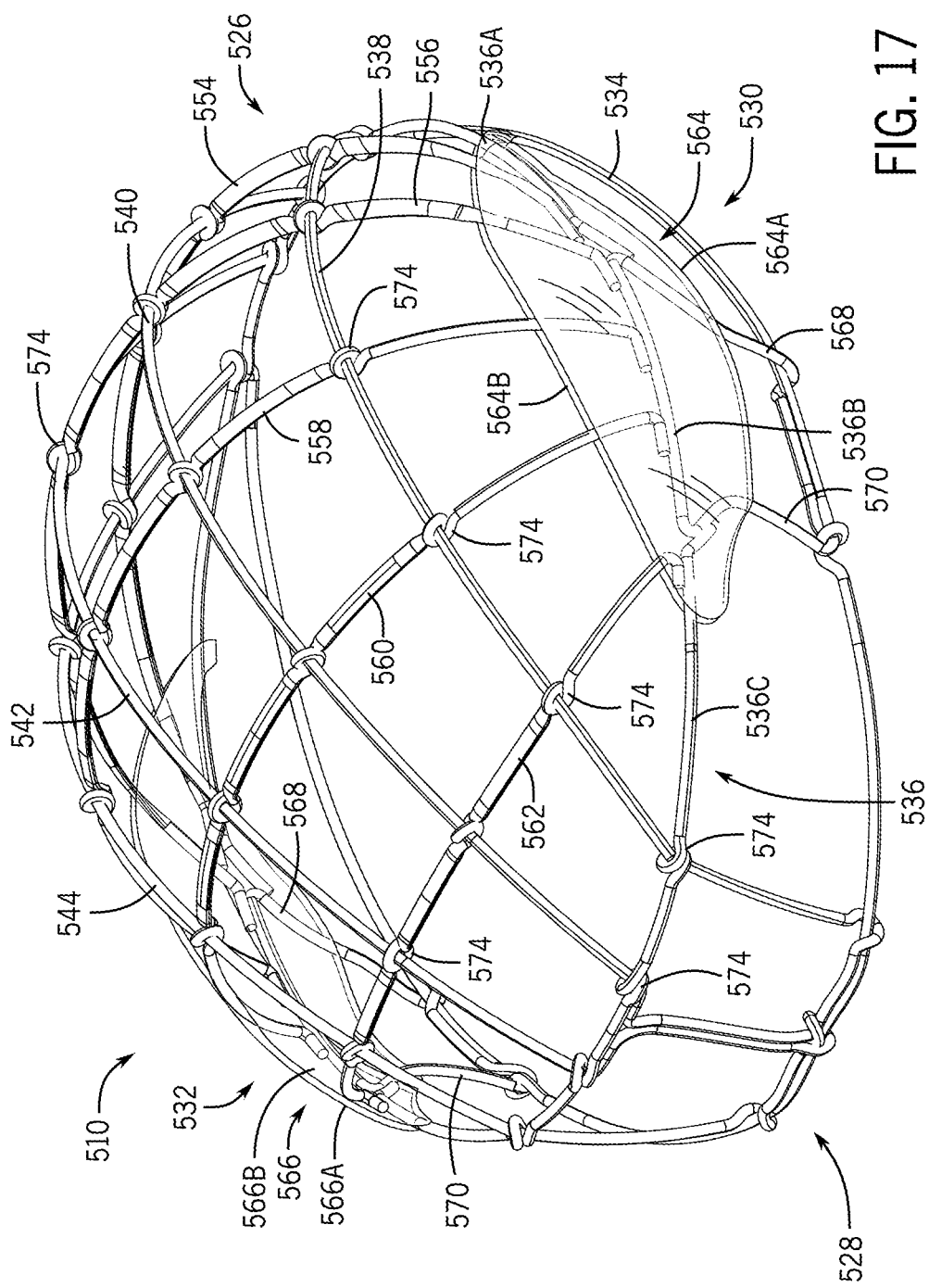
FIG. 17 shows a rear isometric view of the cage of the helmet of FIG. 15.

FIG. 16 shows a front isometric view of the cage 510 in an assembled configuration, while FIG. 17 shows a rear isometric view of the cage 510 also in an assembled configuration. The cage 510 defines a front end 526, a rear end 528, and opposing lateral ends 530, 532. The cage 510 can include rims 534, 536, longitudinal beams 538, 540, 542, 544, transverse beams 554, 556, 558, 560, 562, plates 564, 566, and joists 568, 570. In some embodiments, the rims 534, 536, longitudinal beams 538, 540, 542, 544, transverse beams 554, 556, 558, 560, 562, and joists 568, 570 can each be formed of a single filament of a flexible material, while in other embodiments, the rims 534, 536, longitudinal beams 538, 540, 542, 544, transverse beams 554, 556, 558, 560, 562, and joists 568, 570 can each be a braided filament of flexible material (e.g., braided aramid).

As shown in FIGS. 16 and 17, the rim 534 (e.g., a lower rim) extends around the lower periphery of the cage 510. Situated above the rim 534 is the rim 536 (e.g., an upper rim), which also extends around the lower periphery of the cage 510. In some cases, the rims 534, 536 and/or the joists 568, 570 can comprise multiple components or multiple combinations of components. For example, as shown in FIG. 16, at the front end 526, the rim 534 can be formed as an extension of one or more of the longitudinal beams, such as longitudinal beams 538, 544, and can also be shaped to form the joists 568, 570. That is, the joists 568, 570 can be formed by the rim 534 creating a large loop that wraps around itself. As a result, an upper portion of this continuous loop also forms part of the rim 536. For example, in some cases, the rim 536 can comprise a front rim element 536A that extends around the front end 526 to a middle rim element 536B, formed by the loop that creates the joists 568, 570, and a rear rim element 536C that extends from the middle rim element 536B around or to the rear end 528. In other words, the rim 536 can comprise the front rim element 536A that extends around the front end 526 to the joist 568, a middle rim element 536B that extends between the joists 568, 570, and a rear rim element 536C that extends from the joist 570 around or to the rear end 528.

In some embodiments, one or more (e.g., each) longitudinal beam 538, 540, 542, 544 extends in a longitudinal direction away from the rear end 528 of the cage 510 and towards (e.g., to) the front end 526 of the cage 510. As shown, one or more (e.g., each) longitudinal beam 538, 540, 542, 544 extends to, can be coupled to, or can be integral with, one or both rims 534, 536. Furthermore, in some cases, one or more (e.g., each) of the longitudinal beams 538, 540, 542, 544 can be formed out of a single braided filament (e.g., braided aramid) or multiple longitudinal beams 538, 540, 542, 544 can be formed of the same braided filament. For example, as described above, the outer longitudinal beams 538, 544 can each extend around the front end 526 to form the rim 534. Furthermore, the inner longitudinal beams 540, 542 can be formed of the same filament, which loops around at the front end 526. Additionally, each longitudinal beam 538, 540, 542, 544 can be coupled to (or integral with) the rim 534 at the front end 526 of the cage 510, and can be coupled to both of the rims 534, 536 at the rear end 528 of the cage 510. In some embodiments, as shown in FIG. 17, the inner longitudinal beams 540, 542 can be joined together at the rear end 528 between the rims 534, 536.

In some embodiments, and as shown in FIGS. 16 and 17, one or more (e.g., each) of the transverse beams 554, 556, 558, 560, 562 can be coupled to one or more (e.g., each) of the longitudinal beams 538, 540, 542, 544 at specified coupling locations 574. More specifically, in some embodiments, each transverse beam 554, 556, 558, 560, 562 can be wrapped around itself at a respective coupling location 574 to form a loop, and the longitudinal beams 538, 540, 542, 544 can be routed through the loops. In other words, when the cage 510 is formed, the transverse beams 554, 556, 558, 560, 562 can be wrapped around the longitudinal beams 538, 540, 542, 544 at the coupling locations 574. In some cases, these loops at the coupling locations 574 can help distribute loads over the respective beams 538-544, 554-562. As a result, these loops and corresponding wrapping method can help prevent decoupling of the cage 510 when, for example, the cage 510 is exposed to localized impact forces (e.g., as opposed to a distributed impact force).

Furthermore, in some embodiments, each transverse beam 554, 556, 558, 560, 562 can be wrapped in opposite directions at each subsequent coupling location 574. For example, the transverse beam 554 can include a first loop formed by wrapping the transverse beam 554 first in an upward direction and then back around itself, can include a subsequent, adjacent loop formed by wrapping the transverse beam 554 first in a downward direction and then back around itself, and can include another subsequent, adjacent loop formed by wrapping the transverse beam 554 first in the upward direction and then back around itself, and so forth. In this manner, the coupling locations 574 can be strengthened, for example, compared to subsequent loops formed by wrapping in the same direction. More specifically, the opposing loops can help reduce the beams 538-544, 554-562 from bunching together when the cage 510 is being formed and the longitudinal beams 538, 540, 542, 544 are being pulled through the loops, as further described below. It should be noted that, in some embodiments, the longitudinal beams 538, 540, 542, 544 can include loops and the transverse beams 554, 556, 558, 560, 562 can be routed through the loops.

Furthermore, as shown in FIGS. 16 and 17, the rim 536 can be coupled to one or more (e.g., each) of the longitudinal beams 538, 540, 542, 544 at coupling locations 574 adjacent the front end 526 of the cage 510 and the rear end 528 of the cage 510. More specifically, the rim 536 can be wrapped around itself at the coupling locations 574 to form the loops, similar to that described above with respect to the transverse beams 554, 556, 558, 560, 562, and the longitudinal beams 538, 540, 542, 544 can be routed through the loops formed in the rim 536.

Additionally, as shown in FIGS. 16 and 17, the transverse beams 554, 556, 558, 560, 562 can extend from the rim 536 on the first lateral end 530 to the rim 536 on the second lateral end 532. In some embodiments, as shown, each transverse beam 554, 556, 558, 560, 562 can comprise a separate filament (or separate braided filament) with bent end extensions that lie against or adjacent the rim 536. For example, the bent end extensions can increase contact between the transverse beams 554, 556, 558, 560, 562 and the rim 536, which can increase the structural integrity of the cage 510. The bent end extensions can be coupled to the rim 536 via, for example, an adhesive, through a heat curing process, and/or through a vacuum forming process.

In some embodiments, the plates 564, 566 can help anchor the transverse beams 554, 556, 558, 560, 562 to the rim 536. For example, as shown in FIGS. 16 and 17, the plates 564, 566 can be situated along opposing ends 530, 532 of the cage 510 and are coupled to one or more of (e.g., each of) the transverse beams 554, 556, 558, 560, 562, and the rims 534, 536. For example, the plate 564 is situated on the lateral end 530 of the cage 510, while the plate 566 is situated on the opposing lateral end 532 of the cage 510. A first lateral end (such as the bent end extension) of each of the transverse beams 554, 556, 558, 560, 562 is coupled to the plate 564, the middle rim element 536B is coupled to the plate 564, intermediate ends of the rim elements 536A, 536C that are positioned adjacent the joists 568, 570 are each coupled to the plate 564, and upper portions of the joists 568, 570 are each coupled to the plate 564. Additionally, the plate 564 can extend above and below the middle rim element 536B. Furthermore, the plate 564 can comprise multiple layers that are coupled to the beams by being sandwiched around, and, e.g., coupled together around, either side of the beams. That is, as shown in FIGS. 16 and 17, the plate 564 can include a set of plates comprising a first or outer plate 564A coupled to an outer surface of the cage 510 (shown as transparent in FIG. 16 for clarity) and a second or inner plate 564B coupled to an inner surface of the cage 510 (shown as transparent in FIG. 17 for clarity).

The plate 566 is configured in a similar manner as the plate 564. For example, a second opposite lateral end (such as the bent end extension) of each of the transverse beams 554, 558, 560, 562 is coupled to the plate 566, a portion of the rim 536 that is positioned under each of the second opposite lateral ends of the transverse beams is coupled to the plate 566, and upper portions of the joists 568, 570 are each coupled to the plate 566. Additionally, the plate 566 extends above and below the middle rim element 536B. The plate 566 can also comprise multiple layers that are coupled to the beams by being sandwiched around, and, e.g., coupled together around, either side of the beams. That is, as shown in FIGS. 16 and 17, the plate 566 can include a set of plates comprising first or outer plate 566A coupled to an outer surface of the cage 510 (shown as transparent in FIG. 16 for clarity) and a second plate 566B coupled to an inner surface of the cage 510 (shown as transparent in FIG. 17 for clarity).

In some embodiments, each of the plates 564, 566 can form a bowl shape, having one end curved towards the rear end 528 of the cage 510 and an opposing end curved towards the front end 526 of the cage 510. In other configurations, however, the plates 564, 566 can embody other shapes. Additionally, in some embodiments, the plates 564, 566 can be formed out of substantially rigid materials (e.g., carbon fiber). In some embodiments, the plates 564, 566 can be sandwiched around the cage 510, as described above, when in a malleable state, and then the assembly is cured around in order to harden the plates 564, 566 and couple them to relative portions of the cage 510.

Furthermore, in some embodiments, the configuration of the plates 564, 566 can provide advantages to tensioning of the transverse beams 554, 556, 558, 560, 562. For example, because each of the transverse beams 554, 556, 558, 560, 562 are coupled to both plates 564, 566 (at respective ends), pulling or other movement of the plate 564, 566 can simultaneously tensilely load all the transverse beams 554, 556, 558, 560, 562. Thus, this can ensure that each transverse beam 554, 556, 558, 560, 562 has the same amount of tensile loading (e.g., the tensile loading is substantially the same or that the tensile loading between the same transverse beam for multiple cages 510 is the same (e.g., the tensile loading of a transverse beam 554 of the helmet 500 and the tensile loading of another transverse beam 554 of another helmet 500 is substantially the same. As such, this configuration can provide a highly repeatable tensioning process during manufacturing, ensuring that multiple cages in the production line have similar tensile characteristics.

Figure 18:
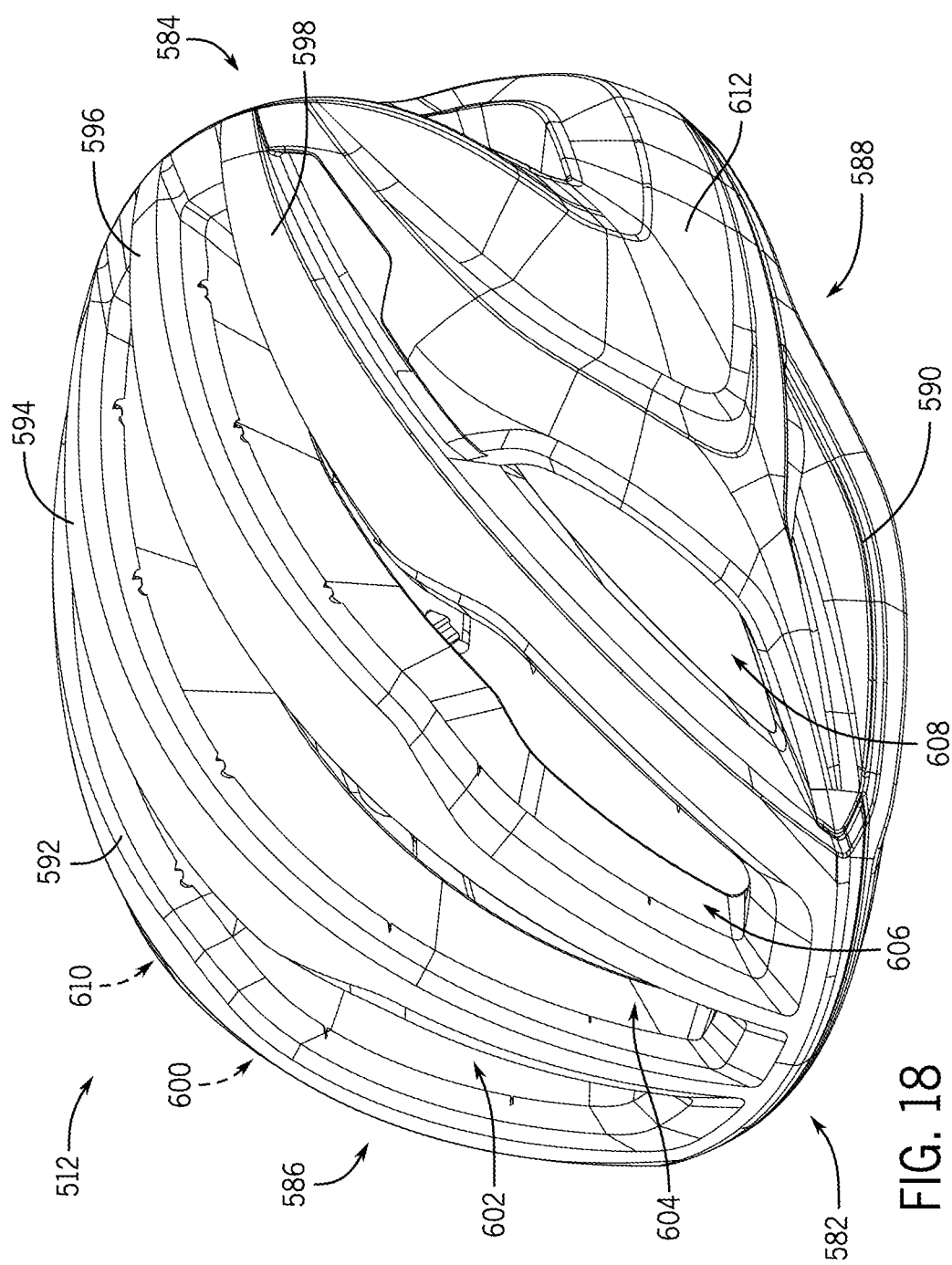
FIG. 18 shows a front isometric view of a body of the helmet of FIG. 15.
Figure 19:
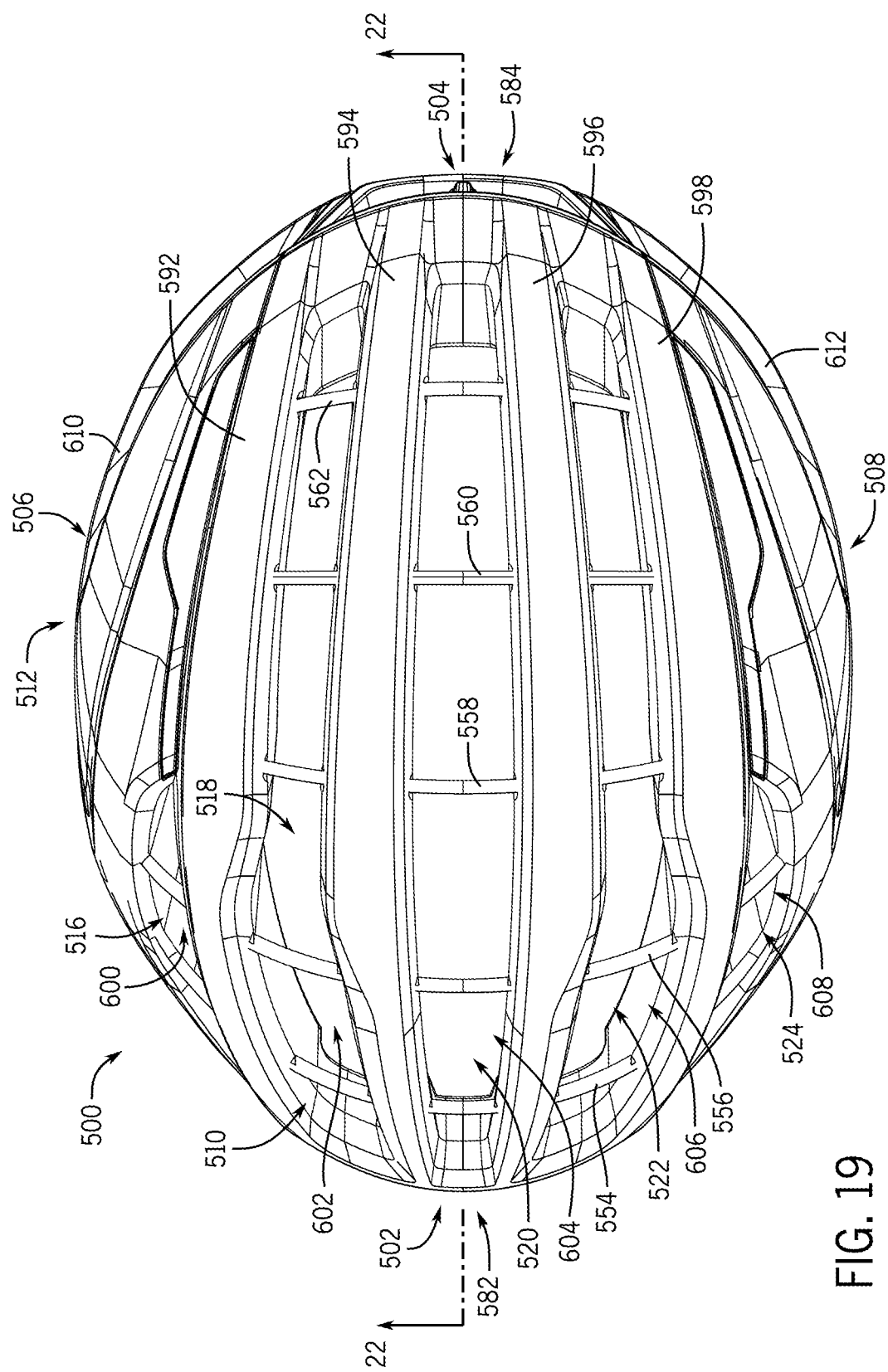
FIG. 19 shows a top view of the helmet of FIG. 15.

Referring now to the body 512 of the helmet 500, FIG. 18 shows a front perspective view of the body 512. FIG. 19 shows a top view of the helmet 500, including the body 512 and the cage 510. As described in more detail below, the body 512 at least partially encapsulates some portions of the cage 510. In some embodiments, the body 512, similarly to the body 112 of FIGS. 1-6 and the body 312 of FIGS. 7-14, can be formed out of an expansive foam polymer (e.g., EPS foam). The body 512 can define a front end 582, a rear end 584, and opposing lateral ends 586, 588. The body 512 can also include a rim 590 situated around the periphery of the body 512, longitudinal ribs 592, 594, 596, 598, and longitudinal openings 600, 602, 604, 606, 608 that are defined between adjacent longitudinal ribs 592, 594, 596, 598, or the rim 590 and a longitudinal rib 592, 594, 596, 598.

As shown, each of the longitudinal ribs 592, 594, 596, 598 generally extends away from the rear end 584 and towards the front end 582 of the body 512, and can have a varying thickness along the longitudinal direction. For example, as shown in FIG. 19, the thickness of one or more (e.g., each) of the longitudinal ribs 592, 594, 596, 598 is relatively uniform near the rear end 584, but may gradually decrease near the front end 582 of the body 512 (or may first increase from the rear end 584 toward a center of the body 512, and then decrease from the center of the body 512 toward the front end 582). In some cases, and as illustrated, the decrease in thickness can be due to a curved cutout that extends longitudinally on one or both lateral sides of each of the longitudinal ribs 592, 594, 596, 598. For example, the longitudinal rib 592 has a curved longitudinal cutout on its lateral side that is closer to the longitudinal center of the body 512, while the longitudinal rib 598 also has a curved longitudinal cutout on its lateral side that is closer to the longitudinal center of the body 512. The longitudinal ribs 594, 596, which are situated between the longitudinal ribs 592, 598 each have a curved longitudinal cutout on both of their lateral sides. In some embodiments, the rim 590 can have a portion 610 (shown in FIG. 19) that extends upwardly and is situated closer to the lateral end 586 of the body 512, and a portion 612 (shown in FIGS. 18 and 19) that also extends upwardly and is situated closer to the lateral end 588 of the body 512. For example, the portions 610, 612 may be mirror images of one another. In some cases, each of the portions 610, 612 of the rim 590 can have a curved longitudinal cutout situated closer to the front end 582 of the body 512 and on its lateral side that is closer to the longitudinal center of the body 512.

As shown in FIGS. 18 and 19, the longitudinal openings 600, 602, 604, 606, 608 extend in a longitudinal direction away from the rear end 584 of the body 512 and towards the front end 582 of the body 512. As noted above, each of the longitudinal openings 600, 602, 604, 606, 608 can be situated between adjacent longitudinal ribs 592, 594, 596, 598, or a longitudinal rib 592, 594, 596, 598 and the rim 590. For example, the longitudinal opening 600 is situated between a portion 610 of the rim 590 along the lateral end 586 and the longitudinal rib 592, the longitudinal opening 602 is situated between the longitudinal ribs 592, 594, the longitudinal opening 604 is situated between the longitudinal ribs 594, 596, the longitudinal opening 606 is situated between the longitudinal ribs 596, 598, and the longitudinal opening 608 is situated between the longitudinal rib 598 and a portion 612 of the rim 590 along the lateral end 588. As described below, each longitudinal opening 600, 602, 604, 606, 608 corresponds to and partially defines a respective vent 516, 518, 520, 522, 524 of the helmet 500 and, thus, each of the longitudinal openings 600, 602, 604, 606, 608 also receives the transverse beams 554, 556, 558, 560, 562 (e.g., each of the transverse beams 554, 556, 558, 560, 562 extends entirely through each of the longitudinal openings 600, 602, 604, 606, 608).

Figure 20:
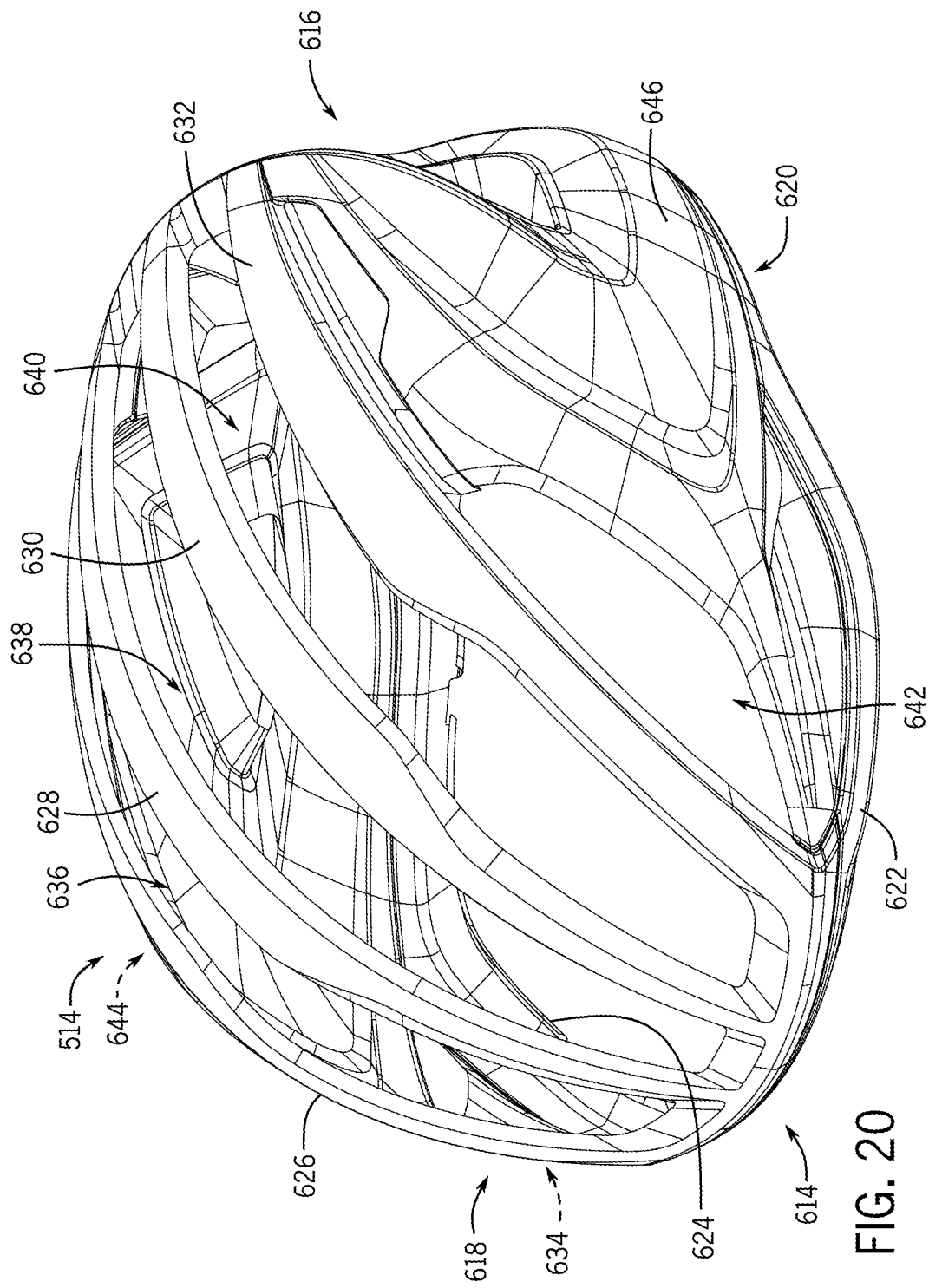
FIG. 20 shows a front isometric view of a shell of the helmet of FIG. 15.

Referring now to the shell 514 of the helmet 500, FIG. 20 shows a front perspective view of the shell 514. When assembled, the shell 514 is positioned on top of the body 512, and the shell 514 can be formed out of a different material as the body 512 and the cage 510 (e.g., a material that has a greater hardness). For example, the shell 514 can be formed out of a relatively rigid material (e.g., a plastic, such as polycarbonate). The shell 514 can define a front end 614, a rear end 616, and opposing lateral ends 618, 620. The shell 514 can include a rim 622 that extends around the periphery of the shell 514, a peripheral flange 624 that is coupled to (or integrally formed with) the rim 622 and which extends towards the center of the shell 514, longitudinal strips 626, 628, 630, 632, and longitudinal openings 634, 636, 638, 640, 642 that are defined either between two adjacent longitudinal strips 626, 628, 630, 632, or a longitudinal strip 626, 628, 630, 632 and a portion of the rim 622. When assembled, each longitudinal strip 626, 628, 630, 632 sits on top of and is coupled to a respective longitudinal rib 592, 594, 596, 598 of the body 512. For example, the longitudinal strip 626 is coupled to and seated on top of the longitudinal rib 592, the longitudinal strip 628 is coupled to and seated on top of the longitudinal rib 594, the longitudinal strip 630 is coupled to and seated on top of the longitudinal rib 596, and the longitudinal strip 632 is coupled to and seated on top of the longitudinal rib 598. Similarly, a portion 644 of the rim 622 positioned near the lateral end 618 of the shell 514 is coupled to the portion 610 of the rim 590 of the body 512. An opposing portion 646 of the rim 622 positioned near the lateral end 620 of the shell 514 is coupled to the portion 612 of the rim 590 of the body 512.

In some embodiments, when assembled, the peripheral flange 624 of the shell 514 is coupled to the body 512 and extends under the rim 590 of the body 512 towards the center of the helmet 500. In this way, the peripheral flange 624 can help to retain the shell 514 to the body 512, so that the coupling mechanism (e.g., an adhesive) between the shell 514 and the body 512 is not the only feature fastening these components together. In other words, the peripheral flange 624 of the shell 514 can help to restrict relative movement between the shell 514 and the body 512.

Referring back to FIG. 19, which shows a top view of the helmet 500 in an assembled configuration. In some embodiments, similarly to the helmet 100 of FIGS. 1-6, and the helmet 300 of FIGS. 7-14, the cage 510 can be overmolded with the body 512, to deposit the body 512 about the cage 510 so that portions of the cage 510 are entirely encapsulated within the body 512. For example, the cage 510 can be placed in a mold (not shown) that has a surface that corresponds to the exterior surface of the body 512. In some cases, portions of the cage 510 that are to be encapsulated with the material of the body 512 are placed between the interior surfaces of the mold, but not in contact with these surfaces of the mold, while portions of the cage 510 that are not to be encapsulated with the material of the body 512 engage and contact the interior surfaces of the mold. In this way, when the expandable material (e.g., EPS foam) is injected into the mold, the expandable material will fill in to contact the interior surfaces of the mold thereby encapsulating portions of the cage 510. However, because the portions of the cage 510 are already in contact with interior surfaces of the mold, the expandable material is prevented from encapsulating this portion of the cage 510. Regardless of how the cage 510 and the body 512 are coupled together, once these are assembled, the shell 514 is placed on top of and is coupled to the body 512. In some embodiments, the shell 514 of the helmet 500 can also be placed in the mold with the cage 510 and molded with the body 512 at the same time as the cage 510.

As shown in FIGS. 15 and 19, the body 512 at least partially encapsulates the cage 510. More specifically, the body 512 can fully encapsulate the cage 510 except for some portions of the transverse beams 554, 556, 558, 560, 562. As a more specific example, the rims 534, 536 are fully encapsulated by the body 512, and all the longitudinal beams 538, 540, 542, 544 are fully encapsulated by the body 512. Thus, each of the longitudinal ribs 592, 594, 596, 598 includes a respective encapsulated longitudinal beam 538, 540, 542, 544. As illustrated, some portions of the transverse beams 554, 556, 558, 560, 562 are encapsulated by the body 512, while other portions are not encapsulated by the body 512 (e.g., do not include any portion of the body 512 surrounding it).

More specifically, in some embodiments, when assembled, each of transverse beams 554, 556, 558, 560, 562 can be structured relative to the body 512 in a similar way. For example, a portion of one or more of the transverse beams 554, 556, 558, 560, 562 (such as the transverse beams 554, 556) extends entirely through the vent 516 and is not encapsulated by the body 512 (e.g., does not include any portion of the body 512 surrounding it), a portion of each of the transverse beams 554, 556, 558, 560, 562 extends entirely through and is encapsulated by the longitudinal rib 592 of the body 512, a portion of each of the transverse beams transverse beams 554, 556, 558, 560, 562 extends entirely though the vent 518 and is not encapsulated by the body 512, a portion of each of the transverse beams 554, 556, 558, 560, 562 extends entirely through and is encapsulated by the longitudinal rib 594 of the body 512, a portion of each of the transverse beams 554, 556, 558, 560, 562 extends entirely though the vent 520 and is not encapsulated by the body 512, a portion of each of the transverse beams 554, 556, 558, 560, 562 extends entirely through and is encapsulated by the longitudinal rib 596 of the body 512, a portion of each of the transverse beams 554, 556, 558, 560, 562 extends entirely though the vent 522 and is not encapsulated by the body 512, a portion of each of the transverse beams 554, 556, 558, 560, 562 extends entirely through and is encapsulated by the longitudinal rib 598 of the body 512, and a portion of one or more of the transverse beams 554, 556, 558, 560, 562 (such as the transverse beams 554, 556) extends entirely though the vent 524 and is not encapsulated by the body 512.

Accordingly, as shown, the helmet 500 includes portions of each of the transverse beams 554, 556, 558, 560, 562 that extend entirely through one or more of the vents 516, 518, 520, 522, 524 are not encapsulated by the body 512. Thus, from the rear end 504 of the helmet 500 to the front end 502 of the helmet 500, only the relatively thin transverse beams 554, 556, 558, 560, 562, which can each be substantially 2.5 mm in thickness, extend between adjacent longitudinal ribs (or a longitudinal rib 592, 594, 596, 598 and a portion of the rim 590 of the body 512). In other words, aside from the transverse beams 354, 356, 358, 360, 362 there are no structures (e.g., bridges) that connect adjacent longitudinal ribs 592, 594, 596, 598 together (or a longitudinal rib 592, 594, 596, 598 to a portion of the rim 590). In this way, the vents 516, 518, 520, 522, 524 can provide enhanced ventilation as only relatively thin cage segments abrupt the flow of air through a vent 516, 518, 520, 522, 524, without sacrificing structural integrity of the helmet 500.

Additionally, in some embodiments, some or all portions of the cage 510 can include additional features. For example, in some embodiments, portions of the cage 510 that are exposed along the vents 516, 518, 520, 522, 524 (or the entire cage 510) can include a coating, such as a thermoplastic polyurethane ("TPU") coating. A TPU coating can, for example, provide protection from UV radiation (e.g., from sunlight) deteriorating or degrading the exposed portions of the cage 510. In some embodiments, the TPU can be applied to the cage 510 by placing one or more strips of TPU on either side of the transverse beams 554, 556, 558, 560, 562, for example, completely covering the transverse beams 554, 556, 558, 560, 562 or only along portions of the transverse beams 554, 556, 558, 560, 562 to be exposed when the helmet 500 is assembled. Once the TPU strips are placed, the assembly (e.g., the transverse beams 554, 556, 558, 560, 562 sandwiched between TPU strips) can be cured so that the TPU melts onto the transverse beams 554, 556, 558, 560, 562. In some embodiments, after curing, the transverse beams 554, 556, 558, 560, 562 can be sanded down to remove additional flashing or excess TPU coating. In other embodiments, the TPU coating can be applied to the exposed portions of the transverse beams 554, 556, 558, 560, 562 after the helmet 500 has been assembled, or along another step in the manufacturing process.

Figure 21:
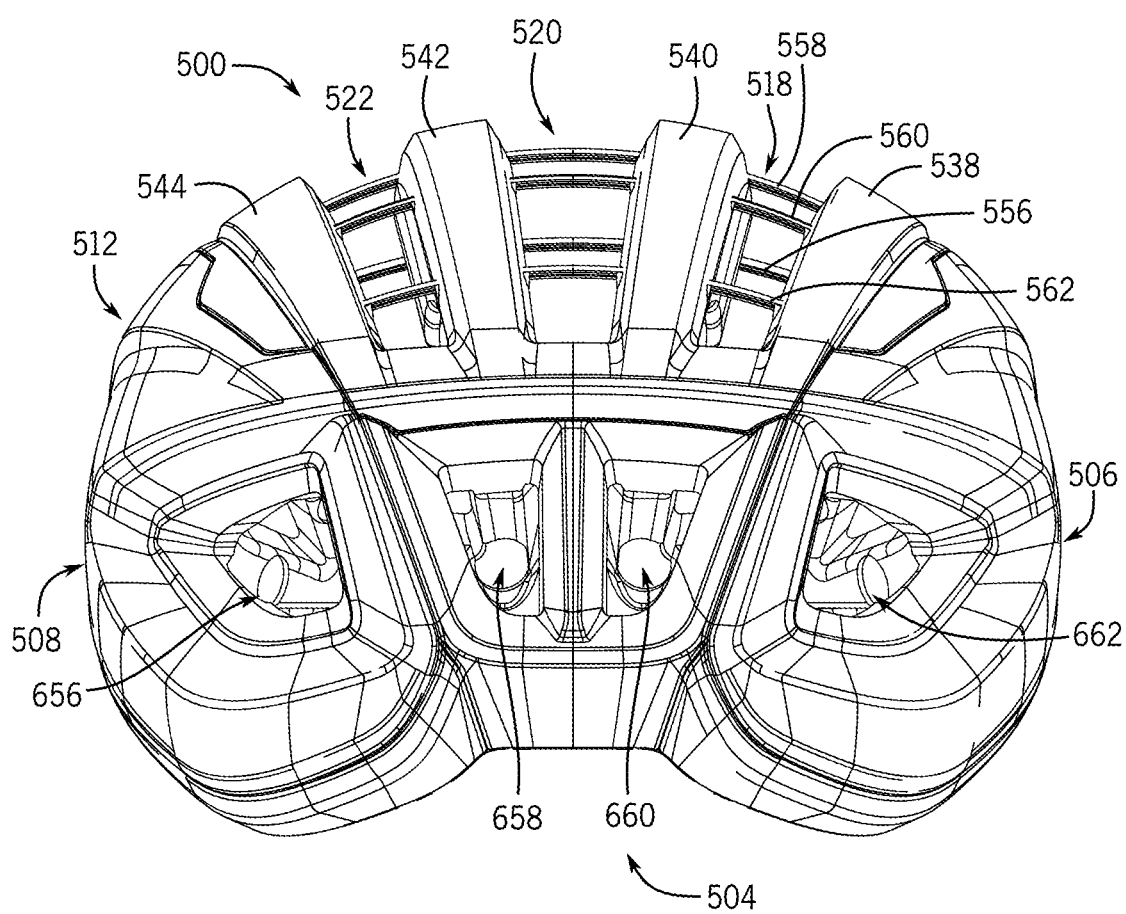
FIG. 21 shows a rear view of the helmet of FIG. 15.

FIG. 21 shows a rear view of the helmet 500. As shown, the rear end 504 can include one or more rear vents 656, 658, 660, 662. For example, the rear vents 656, 658, 660, 662 can be located between the rims 534, 536. That is, at the rear end 504, the body 512 can encapsulate the rims 534, 536, the longitudinal beams 538, 540, 542, 544 that are between the rims 534, 536, and the joists 570. In this manner, the body 512 can define the rear vent 656 between the joist 570 on the lateral end 532, the longitudinal beam 544, the upper rim 536 and the lower rim 534. The body 512 can define the rear vent 658 between the longitudinal beam 544, the longitudinal beam 542 (which may abut the longitudinal beam 540), the upper rim 536, and the lower rim 534. The body 512 can define the rear vent 660 between the longitudinal beam 540

(which may abut the longitudinal beam 542), the longitudinal beam 538, the upper rim 536, and the lower rim 534. And the body 512 can define the rear vent 662 between the longitudinal beam 538, the joist 570 on the lateral end 530, the upper rim 536, and the lower rim 534. Although the rear vents 656, 658, 660, 662 are illustrated as each having a generally rectangular shape with curved edges, in other configurations, the rear vents 656, 658, 660, 662 can have different shapes. Furthermore, although the rear vents 656, 658, 660, 662 are illustrated as being completely open, in some embodiments, a rear region of the rim 336 can extend through one or more of the rear vents 656, 658, 660, 662.

Figure 22:
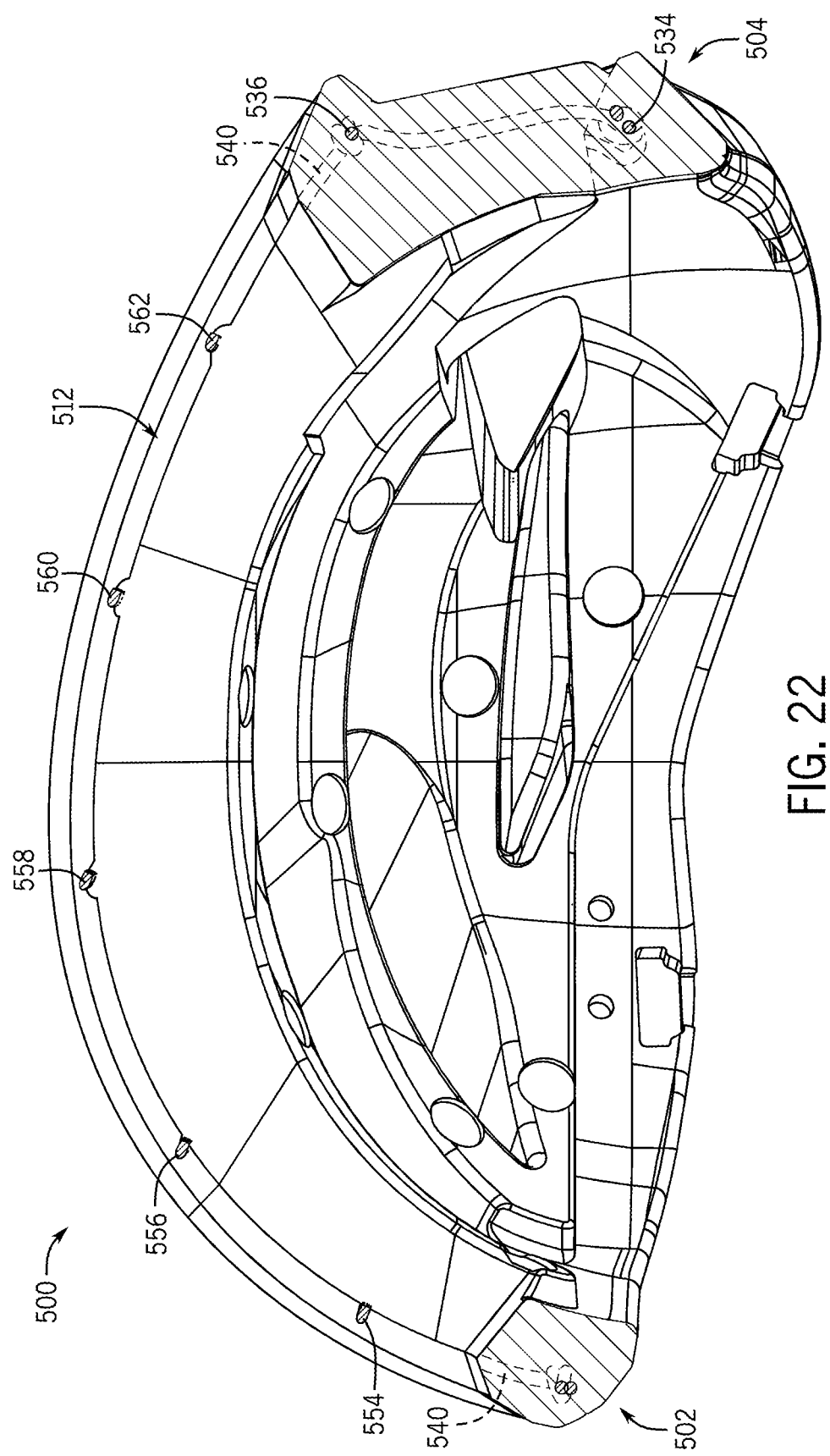
FIG. 22 shows a cross-sectional view of the helmet of FIG. 15 taken along line 22-22 of FIG. 19.

FIG. 22 shows a cross-sectional view of the helmet 500 taken along line 22-22 of FIG. 19. As shown in FIG. 22, in some embodiments, one or more portions of the transverse beams 554, 556, 558, 560, 562, such as portions to be exposed along the vents 516, 518, 520, 522, 524 when the helmet 500 is assembled, can comprise a non-circular cross-section, such as a cross-section that is an oval shape, elliptic shape, or teardrop shape. For example, the non-circular cross-section can include a major axis (e.g., longer axis) that generally extends in a direction from the front end 502 to the rear end 504 (e.g., as compared to a minor axis, or shorter axis, generally extending in a direction from a top to bottom of the helmet 500).

For example, in some embodiments, an entire length of each of the transverse beams 554, 556, 558, 560, 562 includes the non-circular cross-section. In other embodiments, only portions of the transverse beams 554, 556, 558, 560, 562 to be exposed along the vents 516, 518, 520, 522, 524 when the helmet 500 is assembled comprise the non-circular cross-section, while other portions of the transverse beams 554, 556, 558, 560, 562 comprise a circular cross-section. In yet other embodiments, an entire length of each of the transverse beams 554, 556, 558, 560, 562 can comprise a circular cross-section. Additionally, in some embodiments, a desired cross-section of the transverse beams 554, 556, 558, 560, 562 can be achieved by heat compressing the transverse beams 554, 556, 558, 560, 562 into the desired cross-section and/or sanding the transverse beams 554, 556, 558, 560, 562 into the desired cross-section.

Figure 23:
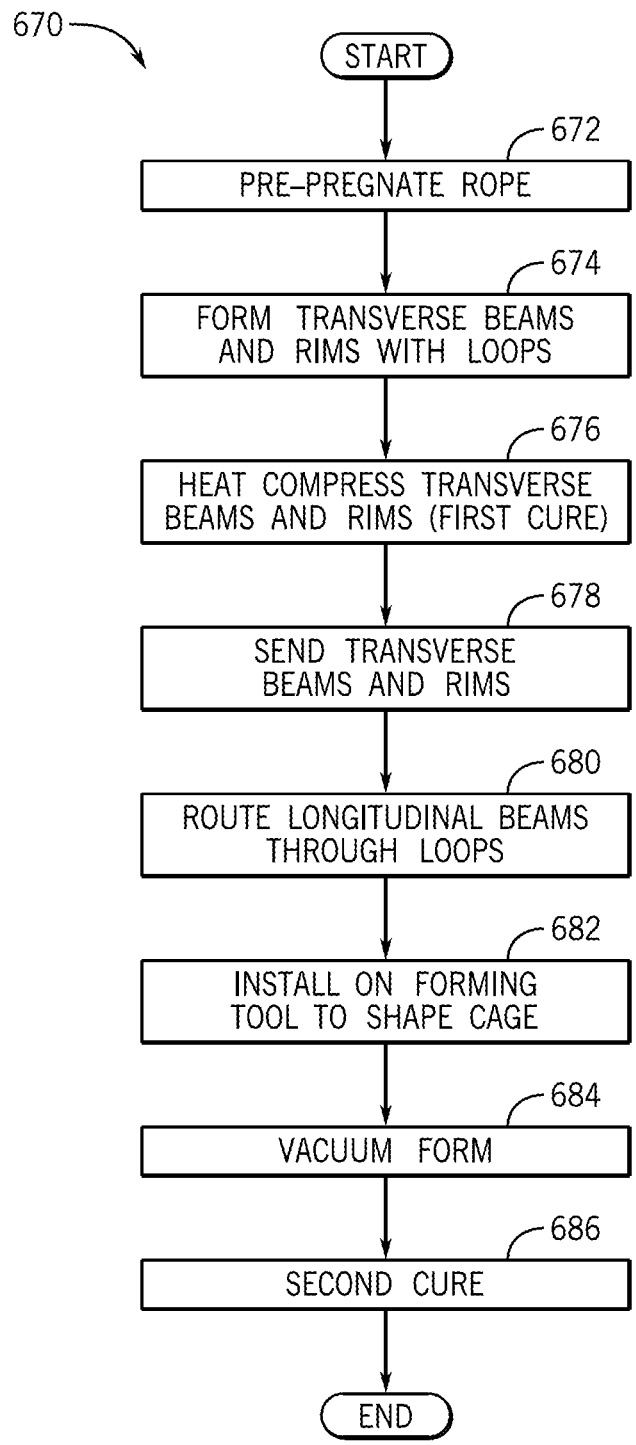
FIG. 23 shows a flow chart illustrating a method of manufacturing a cage for use in the helmet of FIG. 15.

In light of the above, FIG. 23 illustrates a method 670, according to some embodiments, for manufacturing the cage 510. Generally, as shown in FIG. 23, the method 670 can include pre-pregnating braided aramid ropes (step 672), forming the transverse beams 554, 556, 558, 560, 562 and/or rims 534, 536 with loops (step 674), heat compressing the transverse beams 554, 556, 558, 560, 562 and the rims 534, 536 (step 676), sanding the transverse beams 554, 556, 558, 560, 562 and the rims 534, 536 (step 678), routing the longitudinal beams 538, 540, 542, 544 through the loops to form the cage 510 (step 680), installing the cage 510 on a forming tool to set the coupling locations and shape the cage 510 (step 682), vacuum forming the cage (step 684), and curing the cage 510 (step 686).

More specifically, at step 672, braided aramid ropes can be pre-pregnated with a resin. For example, the ropes can be soaked or dipped in a liquid resin and allowed to solidify. At step 674, the pre-pregnated ropes are formed into the transverse beams 554, 556, 558, 560, 562 and/or the rims 534, 536. For example, the transverse beams 554, 556, 558, 560, 562 and/or the rims 534, 536 can be formed in a specialized tool that includes a plurality of troughs, each having one or more spacers along a length of the trough. Ropes can be routed through (or pressed into) each trough, and a loop can be formed at each spacer. In some embodiments, a loop can be formed by wrapping the rope around a tool having a circumference substantially equal to a circumference of the rope. Generally, each trough can receive a separate rope, which may be cut at ends of the trough (thus ensuring equal rope lengths for respective beams and rims across multiple helmets). Additionally, in some embodiments, the troughs can each include a cross-section that corresponds to a desired cross-section of the transverse beams 554, 556, 558, 560 and/or the rims 534, 536, such as a circular or non-circular cross-section, as discussed above. Furthermore, in some embodiments, TPU strips can be placed onto either side of the ropes, e.g., at locations that will ultimately be exposed along the vents 516, 518, 520, 522, 524 when the helmet 500 is fully assembled.

At step 676, once the ropes are routed through the troughs and the loops are formed, a cover can be placed over the tool to compress the ropes within the troughs and the entire assembly can be heated, thus curing the transverse beams 554, 556, 558, 560 and rims 534, 536. By curing the transverse beams 554, 556, 558, 560 and rims 534, 536 at step 676, the ropes become substantially rigid, allowing the loops to maintain their shape as well as the desired cross-section to be maintained. Also, curing causes the TPU strips to melt onto the ropes, providing a TPU coating that can aid in UV protection. At step 678, any flashing or excess pieces of TPU on the ropes following the first cure at step 676 can be removed by sanding down the transverse beams 554, 556, 558, 560 and rims 534, 536. In some embodiments, sanding at step 678 can also help create the desired cross-section of the transverse beams 554, 556, 558, 560.

At step 680, additional pre-pregnated ropes, which correspond to longitudinal beams 538, 540, 542, 544 are routed through the loops of the cured transverse beams 554, 556, 558, 560 and/or rims 534, 536. As these additional ropes have not yet been cured, they are more malleable and can be pulled through the loops. At step 682, the assembled ropes are placed on a forming tool including a plurality of troughs in a pattern matching the final shape and layout of the cage 510 (e.g., as shown in FIGS. 16 and 17). The ropes are further pulled through the loops in order to ensure the coupling locations (e.g., the loops) are properly spaced and sufficient lengths of rope are properly aligned within the forming tool (e.g., to ensure the cage 510 is properly shaped). In some embodiments, the original cut length of the transverse beams 554, 556, 558, 560 can correspond to a length of respective troughs in the forming tool so that, the transverse beams 554, 556, 558, 560 must be pulled in tension to be properly seated within the troughs of the forming tool. Additionally, at step 680, the plates 564, 566 can be positioned along lateral ends 530, 532 of the cage 510, e.g., so that respective transverse beams 554, 556, 558, 560, rims 534, and joists 568, 570 are secured to and/or sandwiched between the respective plates 564, 566, as described above.

Once the longitudinal beams 538, 540, 542, 544, the rims 534, 536, the transverse beams 554, 556, 558, 560, and the plates 564, 566 are properly positioned on the forming tool at step 682, a vacuum forming process is conducted at step 684. For example, at step 684, a sheet of plastic is heated and stretched over the forming tool (which includes the longitudinal beams 538, 540, 542, 544, rims 534, 536, and transverse beams 554, 556, 558, 560 pressed into respective troughs, and plates 564, 566 positioned along either side), and a vacuum is applied to force the plastic against the forming tool. Following vacuum forming at step 684, the cage 510 is cured at step 686. This second cure at step 686 causes all ropes of the cage 510 to become substantially rigid so that the longitudinal beams 538, 540, 542, 544, the rims 534, 536, and the transverse beams 554, 556, 558, 560 are coupled together in a final, desired shape of the cage 510. Furthermore, the cure at step 686 causes the plates 564, 566 to become rigid and coupled to the ropes. Thus, after the cure at step 686, the cage 510 is assembled and ready to be formed with the body 512 and the shell 514, for example, using the molding processes described above with respect to the helmet 100 and the helmet 300. Additionally, after or during the molding process, the helmet 500 can be implemented with any suitable fit system or coupling mechanism to enable the helmet 500 to be coupled to a user's head.

The present disclosure has described one or more embodiments, and it should be appreciated that many equivalents, alternatives, variations, and modifications, aside from those expressly stated, are possible and within the scope of the invention. For example, in some embodiments, any of the above-described cages may be entirely encapsulated by a body. Additionally, it should be noted that features described with respect to one embodiment may be incorporated into another embodiment. For example, in some embodiments, the helmet 100 or one or more elements of the helmet 100 can be similar to the helmet 300 or the helmet 500 or one or more elements of helmet 300 or the helmet 500. In another example, in some embodiments, the helmet 300 or one or more elements of the helmet 300 can be similar to the helmet 100 or the helmet 500 or one or more elements of helmet 100 or the helmet 500. In yet another example, in some embodiments, the helmet 500 or one or more elements of the helmet 500 can be similar to the helmet 100 or the helmet 300 or one or more elements of helmet 100 or the helmet 300.

It is to be understood that the disclosure is not limited in its application to the details of construction and the arrangement of components set forth in the accompanying description or illustrated in the accompanying drawings. Given the benefit of this disclosure, one skilled in the art will appreciate that the disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

As used herein, unless otherwise limited or defined, discussion of particular directions is provided by example only, with regard to particular embodiments or relevant illustrations. For example, discussion of "top," "front," or "back" features is generally intended as a description only of the orientation of such features relative to a reference frame of a particular example or illustration. Correspondingly, for example, a "top" feature may sometimes be disposed below a "bottom" feature (and so on), in some arrangements or embodiments. Further, references to particular rotational or other movements (e.g., counterclockwise rotation) is generally intended as a description only of movement relative a reference frame of a particular example of illustration. Additionally, as used herein, unless otherwise defined or limited, directional terms are used for convenience of reference for discussion of particular figures or examples. For example, references to downward (or other) directions or top (or other) positions may be used to discuss aspects of a particular example or figure, but do not necessarily require similar orientation or geometry in all installations or configurations.

In some implementations, devices or systems disclosed herein can be utilized or installed using methods embodying aspects of the disclosure. Correspondingly, description herein of particular features, capabilities, or intended purposes of a device or system is generally intended to inherently include disclosure of a method of using such features for the intended purposes, a method of implementing such capabilities, and a method of installing disclosed (or otherwise known) components to support these purposes or capabilities. Similarly, unless otherwise indicated or limited, discussion herein of any method of manufacturing or using a particular device or system, including installing the device or system, is intended to inherently include disclosure, as embodiments of the disclosure, of the utilized features and implemented capabilities of such device or system.

As used herein, unless otherwise defined or limited, ordinal numbers are used herein for convenience of reference based generally on the order in which particular components are presented for the relevant part of the disclosure. In this regard, for example, designations such as "first," "second," etc., generally indicate only the order in which the relevant component is introduced for discussion and generally do not indicate or require a particular spatial arrangement, functional or structural primacy or order.

As used herein, unless otherwise defined or limited, the term "about" or "approximately" or "substantially" refers to variation in the numerical quantity that may occur, for example, through typical measuring and manufacturing procedures used for helmets or other articles of manufacture that may include embodiments of the disclosure herein; through inadvertent error in these procedures; through differences in the manufacture, source, or purity of the ingredients used to make the compositions or mixtures or carry out the methods; and the like. Throughout the disclosure, the terms "about," "approximately," and "substantially" refer to a range of values±20% of the numeric value that the term precedes.

This discussion is presented to enable a person skilled in the art to make and use embodiments of the disclosure. Given the benefit of this disclosure, various modifications to the illustrated examples will be readily apparent to those skilled in the art, and the generic principles herein can be applied to other examples and applications without departing from the principles disclosed herein. Thus, embodiments of the disclosure are not intended to be limited to embodiments shown, but are to be accorded the widest scope consistent with the principles and features disclosed herein and the claims below. The accompanying detailed description is to be read with reference to the figures, in which like elements in different figures have like reference numerals. The figures, which are not necessarily to scale, depict selected examples and are not intended to limit the scope of the disclosure. Skilled artisans will recognize the examples provided herein have many useful alternatives and fall within the scope of the disclosure.

Various features and advantages of the disclosure are set forth in the following claims.

What is claimed is:

1. A helmet comprising:
a cage defining a front end, a back end opposite the front end, a first lateral end and a second lateral end opposite the first lateral end, the cage including:

multiple longitudinal beams that extend between the back end of the cage and the front end of the cage; and a transverse beam that extends between the first lateral end of the cage and the second lateral end of the cage, the transverse beam being anchored to one or more of the multiple longitudinal beams; and a body that fully encapsulates the multiple longitudinal beams of the cage and that partially encapsulates the transverse beam, the body defining one or more vents, each vent of the one or more vents being situated between different pairs of adjacent longitudinal beams of the multiple longitudinal beams, and the transverse beam extends through at least one of the one or more vents, wherein the transverse beam is anchored to a first one of the one or more of the multiple longitudinal beams by being wrapped around the first one of the one or more of the multiple longitudinal beams in a first direction and is anchored to an adjacent second one of the one or more of the multiple longitudinal beams by being wrapped around the second one of the one or more of the multiple longitudinal beams in a second, opposite direction.

2. The helmet of claim 1, wherein the one or more vents comprise multiple vents, and the transverse beam is configured to extend through at least two of the multiple vents.

3. The helmet of claim 2, wherein the transverse beam is anchored to two or more of the multiple longitudinal beams and the transverse beam is tensilely loaded when a first end of the transverse beam is anchored to a first one of the two or more of the multiple longitudinal beams and a second end of the transverse beam is anchored to a second one of the two or more of the multiple longitudinal beams.

4. The helmet of claim 1, wherein a width of the transverse beam is less than or equal to approximately 2.5 millimeters.

5. The helmet of claim 1, wherein the transverse beam is anchored to at least one of the one or more of the multiple longitudinal beams with an adhesive.

6. The helmet of claim 1, wherein at least part of the transverse beam is a braided filament.

7. The helmet of claim 6, wherein at least one of the one or more of the multiple longitudinal beams is an unbraided filament.

8. The helmet of claim 1, wherein the cage is encapsulated in a resin layer.

9. The helmet of claim 1, wherein at least part of the transverse beam includes a non-circular cross-section.

10. The helmet of claim 1, wherein at least part of the transverse beam includes a thermoplastic polyurethane coating.

11. The helmet of claim 1, wherein the transverse beam is anchored to at least one of the one or more of the multiple longitudinal beams by being wrapped around the at least one of the one or more of the multiple longitudinal beams multiple times along a length of the at least one of the one or more of the multiple longitudinal beams.

12. The helmet of claim 1, wherein the cage further includes a second transverse beam that extends away from the first lateral end of the cage and toward the second lateral end of the cage, the second transverse beam being anchored to one or more of the multiple longitudinal beams.

13. The helmet of claim 12, wherein the transverse beam and the second transverse beam are anchored to different ones of the multiple longitudinal beams.

14. A helmet comprising:

a cage defining a front end, a back end opposite the front end, a first lateral end and a second lateral end opposite the first lateral end, the cage including:

multiple longitudinal beams that extend between the back end of the cage and the front end of the cage; and a transverse beam that extends between the first lateral end of the cage and the second lateral end of the cage, the transverse beam being anchored to one or more of the multiple longitudinal beams; and a body that fully encapsulates the multiple longitudinal beams of the cage and that partially encapsulates the transverse beam, the body defining one or more vents, each vent of the one or more vents being situated between different pairs of adjacent longitudinal beams of the multiple longitudinal beams, and the transverse beam extends through at least one of the one or more vents, wherein the cage further includes a second transverse beam that extends away from the first lateral end of the cage and toward the second lateral end of the cage, the second transverse beam being anchored to one or more of the multiple longitudinal beams, wherein the transverse beam and the second transverse beam are sandwiched between a first set of plates at the first lateral end and sandwiched between a second set of plates at the second lateral end.

15. A helmet comprising:

a cage defining a front end, a back end opposite the front end, a first lateral end and a second lateral end opposite the first lateral end, the cage including:

multiple longitudinal beams that extend between the back end of the cage and the front end of the cage; and a transverse beam that extends between the first lateral end of the cage and the second lateral end of the cage, the transverse beam being anchored to one or more of the multiple longitudinal beams; and a body that fully encapsulates the multiple longitudinal beams of the cage and that partially encapsulates the transverse beam, the body defining one or more vents, each vent of the one or more vents being situated between different pairs of adjacent longitudinal beams of the multiple longitudinal beams, and the transverse beam extends through at least one of the one or more vents, wherein the transverse beam is anchored to at least one of the one or more of the multiple longitudinal beams by being wrapped around the at least one of the one or more of the multiple longitudinal beams multiple times along a length of the at least one of the one or more of the multiple longitudinal beams.

* * * * *